US010778979B2

(12) United States Patent
Ramasubramonian et al.

(10) Patent No.: US 10,778,979 B2
(45) Date of Patent: Sep. 15, 2020

(54) SIGNALING MECHANISMS FOR EQUAL RANGES AND OTHER DRA PARAMETERS FOR VIDEO CODING

(71) Applicant: QUALCOMM Incorporated, San Diego, CA (US)

(72) Inventors: Adarsh Krishnan Ramasubramonian, Irvine, CA (US); Dmytro Rusanovskyy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/244,871

(22) Filed: Jan. 10, 2019

(65) Prior Publication Data
US 2019/0215517 A1 Jul. 11, 2019

Related U.S. Application Data

(60) Provisional application No. 62/616,383, filed on Jan. 11, 2018.

(51) Int. Cl.
H04N 19/124 (2014.01)
H04N 19/186 (2014.01)
G06T 5/00 (2006.01)
H04N 9/68 (2006.01)
H04N 19/70 (2014.01)
(Continued)

(52) U.S. Cl.
CPC .......... H04N 19/124 (2014.11); G06T 5/009 (2013.01); H04N 9/68 (2013.01); H04N 19/186 (2014.11); H04N 19/36 (2014.11); H04N 19/70 (2014.11); H04N 19/80 (2014.11);
(Continued)

(58) Field of Classification Search
CPC combination set(s) only.
See application file for complete search history.

(56) References Cited

U.S. PATENT DOCUMENTS

2016/0286226 A1* 9/2016 Ridge .................... H04N 19/34

OTHER PUBLICATIONS

Francois E., et al., "HDR CE6: Report of CE6-4.6b Experiment (ETM Using SEI Message)", 23. JCT-VC Meeting; Feb. 19, 2016-Feb. 26, 2016; San Diego; (Joint Collaborative Team on Video Coding of ISO/IEC JTC1/SC29NVG11 and ITU-T SG.16); URL:http://wftp3.itu.int/av-arch/jctvc-site/, No. JCTVC-W0059, Feb. 10, 2016 (Feb. 10, 2016), XP030117831, pp. 1-6.

(Continued)

Primary Examiner — Janese Duley
(74) Attorney, Agent, or Firm — Polsinelli

(57) ABSTRACT

Dynamic Range Adjustment can be used to correct distortions that can occur when the dynamic range of the colors in video are transformed. In various examples, Dynamic Range Adjustment can be performed using a piecewise linear function that takes as input a range of color values. Parameters describing the piecewise linear function can be encoded into a bitstream, and the parameters can be used by a decoding process to reconstruct the piecewise linear function. To improve encoding efficiency, techniques can be applied by which redundant values in the parameters need not be encoded when the range of input values for the piecewise linear function can be divided into portions having equal lengths. The decoding process can derive the omitted values from values that are provided, and can apply the piecewise linear function to decoded video data to perform Dynamic Range Adjustment.

29 Claims, 14 Drawing Sheets

(51) Int. Cl.
*H04N 19/36* (2014.01)
*H04N 19/80* (2014.01)
*H04N 19/117* (2014.01)
*H04N 19/154* (2014.01)

(52) U.S. Cl.
CPC .. *G06T 2207/20208* (2013.01); *H04N 19/117* (2014.11); *H04N 19/154* (2014.11)

(56) References Cited

OTHER PUBLICATIONS

Francois E., et al., "Test Model Draft for SDR Backward Compatibility from CE2.2.a Proposal," 113.MPEG Meeting; Oct. 19, 2015-Oct. 23, 2015; Geneva; (Motion Picture Expert Group or ISO/IEC JTC1/SC29/WG11), No. m37400, Oct. 15, 2015, XP030065768, 17 pages.
Francois (Technicolor) E., et al., "CE12: Report of CE12-1 on out-of-loop Dynamic Range Adaptation," 12. JVET Meeting; Oct. 3, 2010-Oct. 12, 2018; Macao; (The Joint Video Exploration Team of ISO/IEC JTC1/SC29/WG11 and ITU-T SG.16), No. JVET-L0205, Sep. 30, 2018, XP030194076, 7 Pages, Retrieved from the Internet: URL: http://phenix.int-evry.fr/jvet/doc_end_user/documents/12_Macao/wg11/JVET-L0205-v3.zip JVET-L0205_CE12-1_v3.docx [retrieved on Sep. 30, 2018].
International Search Report and Written Opinion—PCT/US2019/013267—ISA/EPO—dated Apr. 18, 2019.

\* cited by examiner

1100

```
┌─────────────────────────────────────────────────────────────────────┐
│ Obtaining video data, wherein, for a portion of a video frame of the video data, │
│ the video data includes parameters describing a piecewise linear function for │
│ dynamic range adjustment of colors in the portion of the video frame, wherein the │
│ parameters divide a range of input values to the piecewise linear function into │
│ multiple non-overlapping ranges, wherein the non-overlapping ranges includes a │
│ first range having a first length and a set of ranges each having a second length, │
│ and wherein the first length is different from the second length │
│ 1102 │
└─────────────────────────────────────────────────────────────────────┘
                                  ▼
┌─────────────────────────────────────────────────────────────────────┐
│              Generating a data structure for the parameters              │
│                                 1104                                 │
└─────────────────────────────────────────────────────────────────────┘
                                  ▼
┌─────────────────────────────────────────────────────────────────────┐
│  Setting an indicator in the data structure to indicate that the non-overlapping  │
│      ranges includes the set of ranges each having the second length      │
│                                 1106                                 │
└─────────────────────────────────────────────────────────────────────┘
                                  ▼
┌─────────────────────────────────────────────────────────────────────┐
│        Setting a first value in the data structure to indicate the second length        │
│                                 1108                                 │
└─────────────────────────────────────────────────────────────────────┘
                                  ▼
┌─────────────────────────────────────────────────────────────────────┐
│ Generating encoded video data from the video data, wherein the data structure is │
│                   included with the encoded video data                   │
│                                 1110                                 │
└─────────────────────────────────────────────────────────────────────┘
```

FIG. 11

SIGNALING MECHANISMS FOR EQUAL RANGES AND OTHER DRA PARAMETERS FOR VIDEO CODING

CROSS-REFERENCES TO RELATED APPLICATIONS

This application claims priority to U.S. Provisional Application No. 62/616,383, filed on Jan. 11, 2018, the entirety of which is hereby incorporated by reference for all purposes.

FIELD

This application is related to video systems and methods. For example, this application is related to the field of coding of video signals with High Dynamic Range (HDR) and Wide Color Gamut (WCG) representations. The application specifies signaling and operations applied to video data in certain color spaces to enable more efficient compression of HDR and WCG video data. Benefits of the subject matter of this application include improving the compression efficiency of hybrid based video coding systems utilized for coding HDR and WCG video data.

BACKGROUND

Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a video coding standard, namely High Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). The latest HEVC draft specification is available as "Recommendation ITU-T H.265: High Efficiency Video Coding (HEVC)," http://www.itu.int/rec/T-REC-H.265-201504-I/en.

BRIEF SUMMARY

In various implementations, provided are systems such as encoding and decoding devices, methods, and computer-readable medium for encoding and decoding video data. Dynamic Range Adjustment can be used to correct distortions that can occur when the dynamic range of the colors in video are transformed. In various examples, Dynamic Range Adjustment can be performed using a piecewise linear function that takes as input a range of color values. Parameters describing the piecewise linear function can be encoded into a bitstream, and the parameters can be used by a decoder to reconstruct the piecewise linear function.

Dynamic Range Adjustment can be used to improve the efficiency of compression of video data. For example, process can be performed at an encoding device that converts video data into a format that may be more suitable for compression, such that fewer bits may be necessary to encode the video data without affecting the quality of the decoded video data. An inverse process can be performed at a decoding device that converts the data back to the same format as the input video data.

Dynamic Range Adjustment can further be used to convert the video data into a representation that is suitable for a particular type of display. The characteristics of a display, to which the representation can be convert, can include, for example, the peak luminance of the display, the dynamic range of the display, the color gamut of the display, and/or the color primaries used by the display. In some examples, Dynamic Range Adjustment may be used to convert video data from SDR to HDR, or vice versa, as may be applicable.

Various techniques can be used to signal parameters that can be used for Dynamic Range Adjustment. The techniques can result in reducing the amount of bits required to encode the parameters, particularly when the range of input values to the piecewise linear function can be divided into segments or partitions each having the same length. These techniques can also be taken advantage of when the range of input values can be divided into a set of range each having the same length, and one range that has a different length.

According to at least one example, a method of encoding video is provided that includes obtaining, at an encoding device, video data, wherein, for a portion of a video frame of the video data, the video data includes parameters describing a piecewise linear function for dynamic range adjustment of colors in the portion of the video frame, wherein the parameters divide a range of input values to the piecewise linear function into a plurality of non-overlapping ranges, wherein the plurality of non-overlapping ranges includes a first range having a first length and a set of ranges each having a second length, and wherein the first length is different from the second length. The method further includes generating a data structure for the parameters. The method further includes setting an indicator in the data structure to indicate that the plurality of non-overlapping ranges includes the set of ranges each having the second length. The method further includes setting a first value in the data structure to indicate the second length. The method further includes generating encoded video data from the video data, wherein the data structure is included with the encoded video data.

In another example, an encoding device is provided that includes a memory configured to store video data and a processor. The processor is configured to and can generate a data structure for the parameters. The processor is configured to and can set an indicator in the data structure to indicate that the plurality of non-overlapping ranges includes the set of ranges each having the second length. The processor is configured to and can set a first value in the data structure to indicate the second length. The processor is configured to and can generate encoded video data from the video data, wherein the data structure is included with the encoded video data.

In another example, a computer-readable medium is provided having stored thereon instructions that when executed by a processor, cause the processor to perform operations including obtaining, at an encoding device, video data, wherein, for a portion of a video frame of the video data, the video data includes parameters describing a piecewise linear function for dynamic range adjustment of colors in the portion of the video frame, wherein the parameters divide a range of input values to the piecewise linear function into a plurality of non-overlapping ranges, wherein the plurality of non-overlapping ranges includes a first range having a first length and a set of ranges each having a second length, and wherein the first length is different from the second length. The instructions further cause the processor to generate a data structure for the parameters. The instructions further cause the processor to set an indicator in the data structure to indicate that the plurality of non-overlapping ranges includes the set of ranges each having the second length. The instructions further cause the processor to set a first value in the data structure to indicate the second length. The instructions further cause the processor to generate encoded video data from the video data, wherein the data structure is included with the encoded video data.

In another example, an apparatus is provided that includes means for obtaining video data, wherein, for a portion of a video frame of the video data, the video data includes parameters describing a piecewise linear function for dynamic range adjustment of colors in the portion of the video frame, wherein the parameters divide a range of input values to the piecewise linear function into a plurality of non-overlapping ranges, wherein the plurality of non-overlapping ranges includes a first range having a first length and a set of ranges each having a second length, and wherein the first length is different from the second length. The apparatus further includes a means for generating a data structure for the parameters. The apparatus further includes a means for setting an indicator in the data structure to indicate that the plurality of non-overlapping ranges includes the set of ranges each having the second length. The apparatus further includes a means for setting a first value in the data structure to indicate the second length. The apparatus further includes a means for generating encoded video data from the video data, wherein the data structure is included with the encoded video data.

In some aspects, the first value indicates the second length as a difference between an end value and a start value of each of the set of ranges.

In some aspects, the first value indicates the second length by indicating a difference between a fixed value and the second length.

In some aspects, the methods, apparatuses, and computer-readable medium described above further comprise setting a second value in the data structure to indicate the first length.

In some aspects, the first range includes a first set of input values from a beginning of the range of input values, and wherein the set of ranges include a second set input values, from the range of input values, that follow the first set of input values.

In some aspects, the plurality of non-overlapping ranges includes a second range having a third length, wherein the third length is different from the second length. In these aspects, the methods, apparatuses, and computer-readable medium described above further comprise setting a second indicator in the data structure to indicate that the plurality of non-overlapping ranges includes the first range and the second range. These aspects further comprise setting a third value in the data structure to indicate the third length.

In some aspects, the first value is equal to a number of ranges in the set of ranges multiplied by the second length.

In some aspects, the set of ranges include a first set of input values from a beginning of the range of input values, and wherein the first range includes a second set of input values, from the range of input values, that follow the first set of input values.

In some aspects, the parameters further include scale factors associated with each of the plurality of non-overlapping ranges. In these aspects, the methods, apparatuses, and computer-readable medium described above further comprise adding the scale factors to the data structure.

In some aspects, the methods, apparatuses, and computer-readable medium described above further comprise including the data structure in a Supplementary Enhancement Information (SEI) message, a slice header, or a parameter set.

According to at least one example, a method of decoding video data is provided that includes The method further includes determining, for a portion of a video frame from of the encoded video data, a data structure including parameters describing a piecewise linear function for dynamic range adjustment of colors in the portion of the video frame, wherein the parameters divide a range of input values to the piecewise linear function into a plurality of non-overlapping ranges. The method further include determining, from an indicator in the data structure, that the plurality of non-overlapping ranges include a first range having a first length and a set of ranges each having a second length, wherein the first length is different from the second length. The method further includes determining, using a first value in the data structure, the second length. The method further includes determining the first length using information provided by the data structure. The method further includes reconstructing the piecewise linear function using the first length, the second length, and scale factors associated with each of the plurality of non-overlapping ranges, wherein the scale factors are included in the data structure. The method further includes decoding the portion of the video frame. The method further includes applying the piecewise linear function to the colors in the portion of the video frame to perform dynamic range adjustment.

In another example, a decoding is provided that includes a memory configured to store video data and a processor. The processor is configured to and can determine, for a portion of a video frame from of the encoded video data, a data structure including parameters describing a piecewise linear function for dynamic range adjustment of colors in the portion of the video frame, wherein the parameters divide a range of input values to the piecewise linear function into a plurality of non-overlapping ranges. The processor is configured to and can determine, from an indicator in the data structure, that the plurality of non-overlapping ranges include a first range have a first length and a set of ranges each having a second length, wherein the first length is different from the second length. The processor is configured to and can determine, using a first value in the data structure, the second length. The processor is configured to and can determine the first length using information provided by the data structure. The processor is configured to and can reconstruct the piecewise linear function using the first length, the second length, and scale factors associated with each of the plurality of non-overlapping ranges, wherein the scale factors are included in the data structure. The processor is configured to and can decode the portion of the video frame. The processor is configured to and can apply the piecewise linear function to the colors in the portion of the video frame to perform dynamic range adjustment.

In another example, a computer-readable medium is provided having stored thereon instructions that when executed by a processor, cause the processor to perform operations including obtaining encoded video data. The instructions can further cause the processor to determine, for a portion of a video frame from of the encoded video data, a data structure including parameters describing a piecewise linear function for dynamic range adjustment of colors in the portion of the video frame, wherein the parameters divide a range of input values to the piecewise linear function into a plurality of non-overlapping ranges. The instructions can further cause the processor to determine, from an indicator in the data structure, that the plurality of non-overlapping ranges include a first range having a first length and a set of ranges each having a second length, wherein the first length is different from the second length. The instructions can further cause the processor to determine, using a first value in the data structure, the second length. The instructions can further cause the processor to determine the first length using the data structure. The instructions can further cause the processor to reconstruct the piecewise linear function using the first length, the second length, and scale factors associated with each of the plurality of non-overlapping ranges, wherein the scale factors are included in the data structure. The instructions can further cause the processor to decode the portion of the video frame. The instructions can further cause the processor to apply the piecewise linear function to the colors in the portion of the video frame to perform dynamic range adjustment.

In another example, an apparatus is provided that includes means for obtaining encoded video data. The apparatus further comprises means for determining, for a portion of a video frame from of the encoded video data, a data structure including parameters describing a piecewise linear function for dynamic range adjustment of colors in the portion of the video frame, wherein the parameters divide a range of input values to the piecewise linear function into a plurality of non-overlapping ranges. The apparatus further comprises means for determining, from an indicator in the data structure, that the plurality of non-overlapping ranges include a first range having a first length and a set of ranges each having a second length, wherein the first length is different from the second length. The apparatus further comprises means for determining, using a first value in the data structure, the second length. The apparatus further comprises means for determining the first length using the data structure. The apparatus further comprises means for reconstructing the piecewise linear function using the first length, the second length, and scale factors associated with each of the plurality of non-overlapping ranges, wherein the scale factors are included in the data structure. The apparatus further comprises means for decoding the portion of the video frame. The apparatus further comprises means for applying the piecewise linear function to the colors in the portion of the video frame to perform dynamic range adjustment.

In some aspects, the first value provides the second length and wherein a second value in the data structure provides the first length.

In some aspects, the first value indicates the second length by indicating a different between a fixed value and the second length.

In some aspects, a second value in the data structure provides the first length. In these aspects, the methods, apparatuses, and computer-readable medium further comprise determining from an index associated with the second value that the first range includes a first set of input values from a beginning of the range of input values, and wherein the set of ranges include a second set input values, from the range of input values, that follow the first set of input values.

In some aspects, the methods, apparatuses, and computer-readable medium described above further comprise determining, from a second indicator in the data structure, that the plurality of non-overlapping ranges includes a second range having a third length, wherein third length is different from the second length. These aspects further comprise determining the third length from a third value in the data structure.

In some aspects, the first length is equal to a total length of the set of ranges, and wherein determining the second length includes dividing the first length by a number of ranges in the set of ranges.

In some aspects, the methods, apparatuses, and computer-readable medium described above further comprise determining, based on the first value, that the set of ranges include a first set of input values from a beginning of the range of input values, and wherein the first range includes a second set of input values, from the range of input values, that follow the first set of input values.

In some aspects, the parameters are included in a Supplementary Enhancement Information (SEI) message, a slice header, or a parameter set.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the of various implementations are described in detail below with reference to the following drawing figures:

FIG. 11 includes a flowchart that illustrates an example of a process for encoding video data;

DETAILED DESCRIPTION

Figure 1:
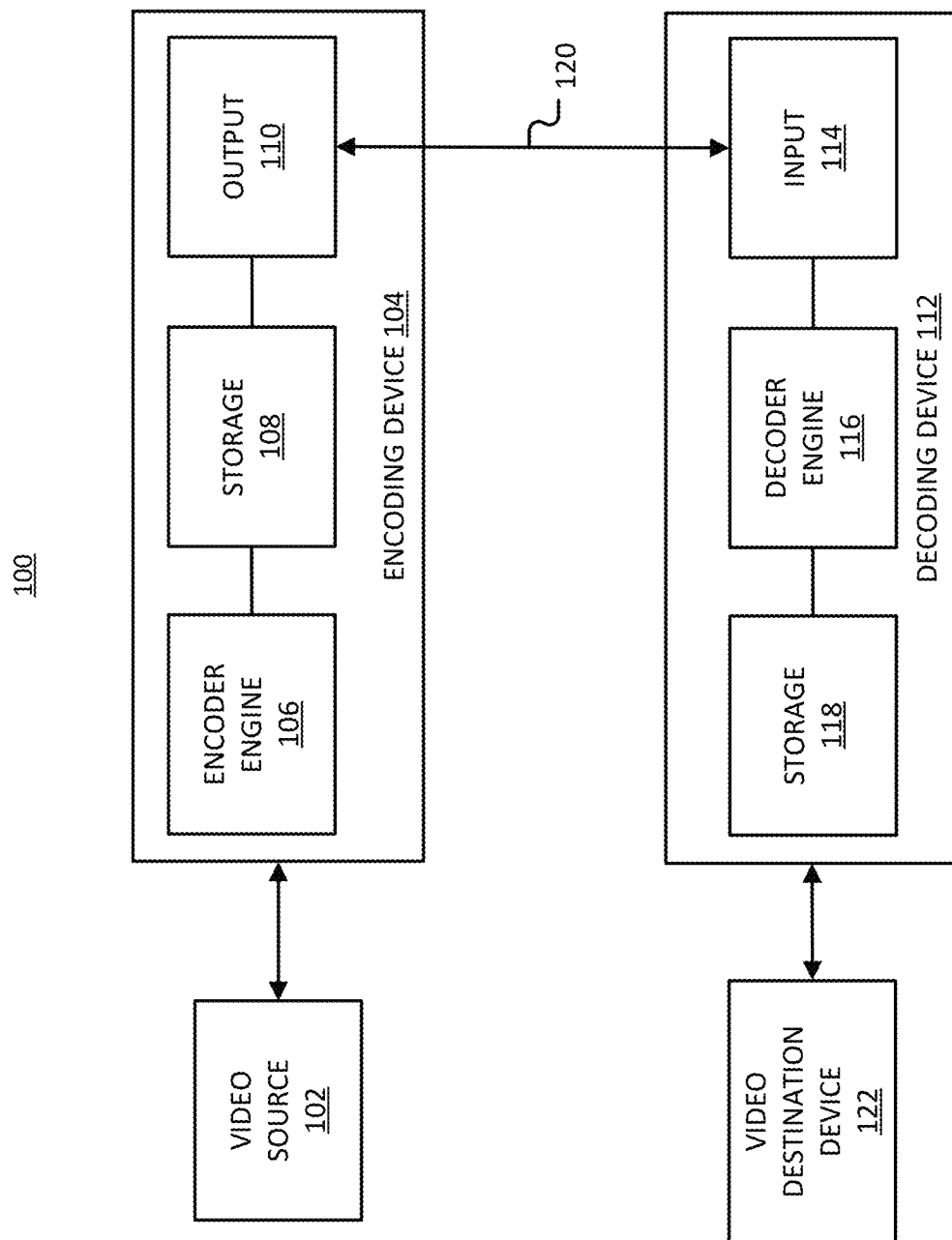
FIG. 1 includes a block diagram illustrating a system that includes an encoding device and a decoding device.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality. As used herein, "coding" can refer to "encoding" and "decoding."

Color volume transformation is a process by which the range of colors in a video can be transformed, for example to reduce the color volume for purposes of encoding or compressing the video data. An inverse color transformation process can restore the reduced color volume to the original color volume. The transformation may be a lossy process, meaning that some color information may be lost by the transformation process, which cannot be recovered when the inverse transformation is applied. Because of data loss or other issues distortions may occur in the colors in the video, such as bleeding or mismatching colors.

Dynamic Range Adjustment (DRA) is a process for compensating for distortions that may occur during color volume transformation. Dynamic Range Adjustment can compensate for changes in the dynamic range of the colors in a video that may occur during color volume transformation. Dynamic Range Adjustment can include representing the dynamic range of a group of video frames, of one video frame, and/or of a portion of a video frame using a piecewise linear function. An encoder can signal parameters that describe the piecewise linear function in a bitstream (e.g., encode the parameter values and include the encoded values in the bitstream), along with other data that represents the video frames. A decoder can then use the parameters to reconstruct the piecewise linear function, and use the piecewise linear function to adjust the dynamic range of the corresponding group of frames, frame, and/or portion of a video frame.

Video data may be compressed in order to reduce the number of bits used to represent the data. The compression can be performed such that the trade-off between the quality of the reconstructed video and the number of bits used to represent the data satisfies a particular application and/or a metric determined to be satisfactory for consumers of the content. A Dynamic Range Adjustment may be applied on video data such that the video data is converted to a domain that is capable of providing a better trade-off of quality and number of bits. An inverse process can restore the video data back to the original domain.

Dynamic Range Adjustment may also be applied to convert video such that it is suitable for a particular type of display. The video data may be encoded as such, or may be coded after application of Dynamic Range Adjustment. The resultant video may be suitable for a particular set (e.g., Set A) of display characteristics. A corresponding Dynamic Range Adjustment may be applied at the decoder to convert the decoded video such that the converted video is suitable for a different set (e.g., Set B) of display characteristics. When the display characteristics match Set A, Dynamic Range Adjustment may not need to be performed at the decoder. The set of characteristics of display may include, for example, peak luminance of display, dynamic range, color gamut, and/or color primaries of the display, among other examples. In some examples, Set A may also apply to an SDR display (or HDR display) and Set B may apply to a HDR display (or SDR display). In these examples, Dynamic Range Adjustment maps the content from SDR to HDR (or HDR to SDR).

Signaling (e.g., describing in an encoded bitstream) a piecewise linear function can require a certain number of bits, which may represent redundant information. For example, one way to describe a piecewise linear function is to divide the range of input values for the function into segments that each have constant slope, in which case the function can be signaled by including the length of each segment and the slope of each segment in the encoded data. For some content, the function may be such that the segments can be of equal length, in which case the length component is redundant. In this example, coding efficiency (e.g., the compactness of the bitstream) can be improved by signaling only the slope of each segment. For some content, however, only a portion of the range can be divided into segments having constant slopes. For example, for some content, the range of input values can be divided into a set of ranges having equal lengths and one range that has a different length. In this example, one option for signaling in the ranges is to indicate the length of each range and the slope. This may be less efficient, because the length component of the equal-length ranges will be the same and thus redundantly signaled. An alternative option is to divide all of the range of input values, including the one range of unequal length, into equal lengths, and signaling the slope of each resulting segment. This may also be less efficient, because in this case multiple lengths would be signaled for a range that could otherwise be signaled using one length.

In various implementations, provided are systems, methods, and instructions stored on computer-readable medium for encoding a piecewise linear function used from Dynamic Range Adjustment, and for decoding parameters that can be used to reconstruct the piecewise linear function. The parameters for the piecewise linear function can be included in a data structure, which can be provided with the encoded video data to which the parameters apply.

In various examples, the range of input values to the piecewise linear function can be divided into non-overlapping ranges. When the ranges include a set that each have the same length, the one length can be indicated in a data structure. This can reduce the number of bits needed to encode the data structure, in that the individual lengths of the ranges need not be included in the data structure. When the ranges also include one or possibly two ranges that are not of the same length as the ranges that have the same length, then the data structure can include separate components to indicate one or both of these other lengths, or one or both lengths can be derived from parameters used to indicate the lengths of the ranges that are of the same length. This enables the one value for indicating the lengths of the ranges that are of the same length to be used, without having to resort to individually indicating the lengths of each of the ranges.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame of a video is a still image of a scene. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision, or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or the like) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units including VCL NAL units and non-VCL NAL units. VCL NAL units include coded picture data forming a coded video bitstream. For example, a sequence of bits forming the coded video bitstream is resent in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some examples, the VPS, SPS, or PPS may be transmitted in-band with the encoded bitstream. In some examples, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some examples, an SEI message can be signaled separately from the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116 or to storage 118 for later use by the decoder engine 116. The decoder engine 116 may decode the encoded video bitstream data by entropy decoding (e.g., using an entropy decoder) and extracting the elements of the one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 13. An example of specific details of the decoding device 112 is described below with reference to FIG. 14.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

Various standards have also been defined that describe the colors in a captured video, including the contrast ratio (e.g., the brightness or darkness of pixels in the video) and the color accuracy, among other things. Color parameters can be used, for example, by a display device that is able to use the color parameters to determine how to display the pixels in the video. One example standard from the International Telecommunication Union (ITU), ITU-R Recommendation BT.709 (referred to herein as "BT.709"), defines a standard for High-Definition Television (HDTV). Color parameters defined by BT.709 are usually referred to as Standard Dynamic Range (SDR) and standard color gamut. Another example standard is ITU-R Recommendation BT.2020 (referred to herein as "BT.2020"), which defines a standard for Ultra-High-Definition Television (UHDTV). The color parameters defined by BT.2020 are commonly referred to as High Dynamic Range (HDR) and Wide Color Gamut (WCG). Dynamic range and color gamut are referred to herein collectively as color volume.

Next generation video applications are anticipated to operate with video data representing captured scenery with HDR and WCG. Parameters of the utilized dynamic range and color gamut are two independent attributes of video content, and their specification for purposes of digital television and multimedia services are defined by several international standards. For example, as noted above, BT.709 defines parameters for HDTV, such as SDR and standard color gamut, and BT. 2020 specifies UHDTV parameters such as HDR and wide color gamut. There are also other standards development organizations documents specifying these attributes in other systems, e.g. P3 color gamut is defined in SMPTE-231-2 and some parameters of HDR are defined STMPTE-2084.

Dynamic range can be defined as the ratio between the minimum and maximum brightness of a video signal. Dynamic range can also be measured in terms of f-stops. For instance, in cameras, an f-stop is the ratio of the focal length of a lens to the diameter of camera's aperture. One f-stop can correspond to a doubling of the dynamic range of a video signal. As an example, MPEG defines HDR content as content that features brightness variations of more than 16 f-stops. In some examples, a dynamic range between 10 to 16 f-stops is considered an intermediate dynamic range, though in other examples this is considered an HDR dynamic range. The human visual system is capable for perceiving much larger dynamic range, however, the human visual system includes an adaptation mechanism to narrow the simultaneous range.

Figure 2:
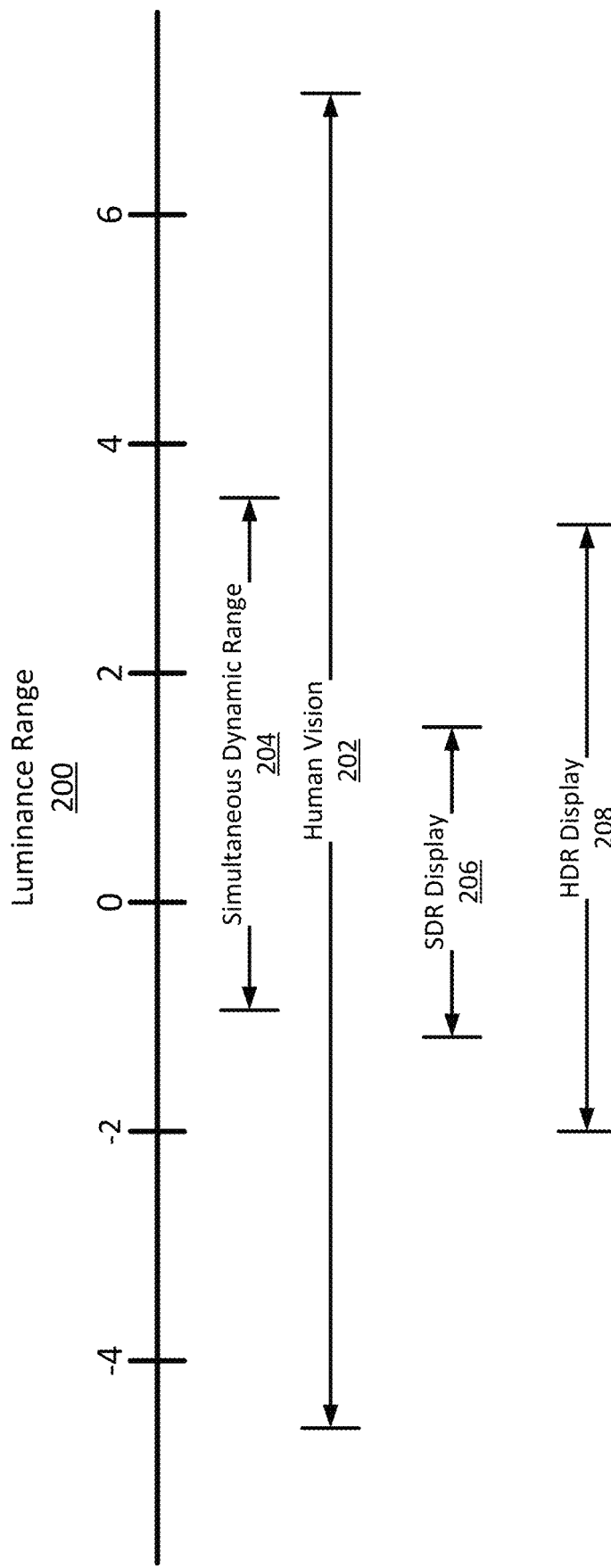
FIG. 2 illustrates the dynamic range of typical human vision, in comparison with the dynamic range of various display types.

FIG. 2 illustrates the dynamic range of typical human vision 202, in comparison with the dynamic range of various display types. FIG. 2 illustrates a luminance range 200, in a nits log scale (e.g., in $cd/m^2$ logarithmic scale). By way of example, starlight is at approximately 0.0001 nits, or −4 on the illustrated luminance range 200, and moonlight is at about 0.01 nits (−2 on the luminance range 200). Typical indoor light may be between 1 and 100 nits (0 and 2 on the luminance range 200). Sunlight may be between 10,000 nits and 1,000,000 nits (4 and 6 on the luminance range 200).

Human vision 202 is capable of perceiving anywhere between less than 0.0001 nits to greater than 1,000,000 nits, with the precise range varying from person to person. The dynamic range of human vision 202 includes a simultaneous dynamic range 204. The simultaneous dynamic range 204 is defined as the ratio between the highest and lowest luminance values at which objects can be detected, while the eye is at full adaption. Full adaptation occurs when the eye is at a steady state after having adjusted to a current ambient light condition or luminance level. Though the simultaneous dynamic range 204 is illustrated in the example of FIG. 2 as between about 0.1 nits and about 3200 nits, the simultaneous dynamic range 204 can be centered at other points along the luminance range 200 and the width can vary at different luminance levels. Additionally, the simultaneous dynamic range 204 can vary from one person to another.

FIG. 2 further illustrates an approximate dynamic range for SDR displays 206 and HDR display 208. SDR displays include monitors, televisions, tablet screens, smart phone screens, and other display devices that are capable of displaying SDR content. HDR displays include, for example, ultra-high-definition televisions and other display devices that are capable of displaying HDR content.

BT.709 provides that the dynamic range of SDR displays 206 can be about 0.1 to 100 nits, or about 10 f-stops, which is significantly less than the dynamic range of human vision 202. The dynamic range of SDR displays 206 is also less than the illustrated simultaneous dynamic range 204. Some video application and services are regulated by Rec.709 and provide SDR, and typically support a range of brightness (or luminance) of around 0.1 to 100 nits. SDR displays are also unable to accurately reproduce night time conditions (e.g., starlight, at about 0.0001 nits) or bright outdoor conditions (e.g., around 1,000,000 nits). Some SDR displays, however, may support a peak brightness larger than 100 nits, and may display SDR content with in a range outside 0.1 to 100 nits.

Next generation video services are expected to provide dynamic range of up-to 16 f-stops. HDR displays can cover a wider dynamic range than can SDR displays. For example, HDR displays may have a dynamic range of about 0.01 nits to about 5600 nits (or 16 f-stops). While HDR displays also do not encompass the dynamic range of human vision, HDR displays may come closer to being able to cover the simultaneous dynamic range 204 of the average person. Specifications for dynamic range parameters for HDR displays can be found, for example, in BT.2020 and ST 2084.

Figure 3:
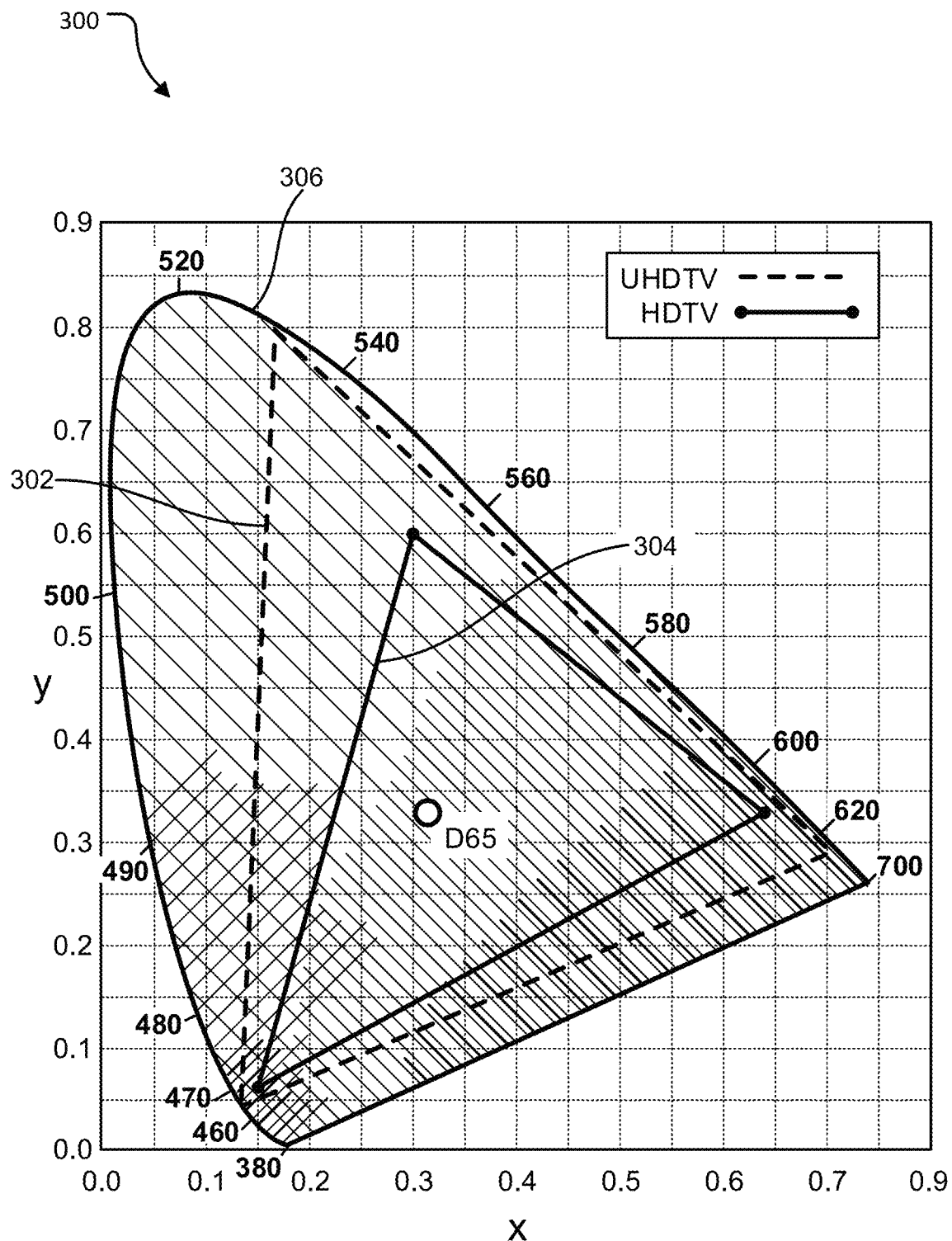
FIG. 3 illustrates an example of a chromaticity diagram.

Color gamut describes the range of colors that are available on a particular device, such as a display or a printer. Color gamut can also be referred to as color dimension. FIG. 3 illustrates an example of a chromaticity diagram 300, overlaid with a triangle representing an SDR color gamut 304 and a triangle representing an HDR color gamut 302. Values on the curve 306 in the diagram 300 are the spectrum of colors; that is, the colors evoked by a wavelength of light in the visible spectrum. The colors below the curve 306 are non-spectral: the straight line between the lower points of the curve 306 is referred to as the line of purples, and the colors within the interior of the diagram 300 are unsaturated colors that are various mixtures of a spectral color or a purple color with white. A point labeled D65 indicates the location of white for the illustrated spectral curve 306. The curve 306 can also be referred to as the spectrum locus or spectral locus, representing limits of the natural colors.

The triangle representing an SDR color gamut 304 is based on the red, green, and blue color primaries as provided by BT.709. The SDR color gamut 304 is the color space used by HDTVs, SDR broadcasts, and other digital media content.

The triangle representing the wide HDR color gamut 302 is based on the red, green, and blue color primaries as provided by BT.2020. As illustrated by FIG. 3, the HDR color gamut 302 provides about 70% more colors than the SDR color gamut 304. Color gamuts defined by other standards, such as Digital Cinema Initiatives (DCI) P3 (referred to as DCI-P3) provide some colors outside the HDR color gamut 302, but do not fully contain the HDR color gamut 302. DCI-P3 is used for digital move projection.

Table 1 illustrates examples of colorimetry parameters for selected color spaces, including those provided by BT.709, BT.2020, and DCI-P3. For each color space, Table 1 provides an x and a y coordinate for a chromaticity diagram.

TABLE 1

Colorimetry parameters for selected color spaces

| Color Space | White Point | | Primary Colors | | | | | |
|---|---|---|---|---|---|---|---|---|
| | $x_w$ | $y_w$ | $x_r$ | $y_r$ | $x_g$ | $y_g$ | $x_b$ | $y_b$ |
| DCI-P3 | 0.314 | 0.351 | 0.68 | 0.32 | 0.265 | 0.69 | 0.15 | 0.06 |
| BT.709 | 0.3127 | 0.329 | 0.64 | 0.33 | 0.3 | 0.6 | 0.15 | 0.06 |
| BT.2020 | 0.3127 | 0.329 | 0.708 | 0.292 | 0.170 | 0.797 | 0.131 | 0.046 |

Video data with a large color volume (e.g., video data with a high dynamic range and wide color gamut) can be acquired and stored with a high degree of precision per component. For example, floating point values can be used to represent the luma and chroma values of each pixel. As a further example, 4:4:4 chroma format, where the luma, chroma-blue, and chroma-red components each have the same sample rate, may be used. The 4:4:4 notation can also be used to refer to the Red-Green-Blue (RGB) color format. As a further example, a very wide color space, such as that defined by International Commission on Illumination (CIE) 1931 XYZ, may be used. Video data represented with a high degree of precision may be nearly mathematically lossless. A high-precision representation, however, may include redundancies and may not be optimal for compression. Thus, a lower-precision format that aims to display the color volume that can be seen by the human eye is often used.

Figure 4:
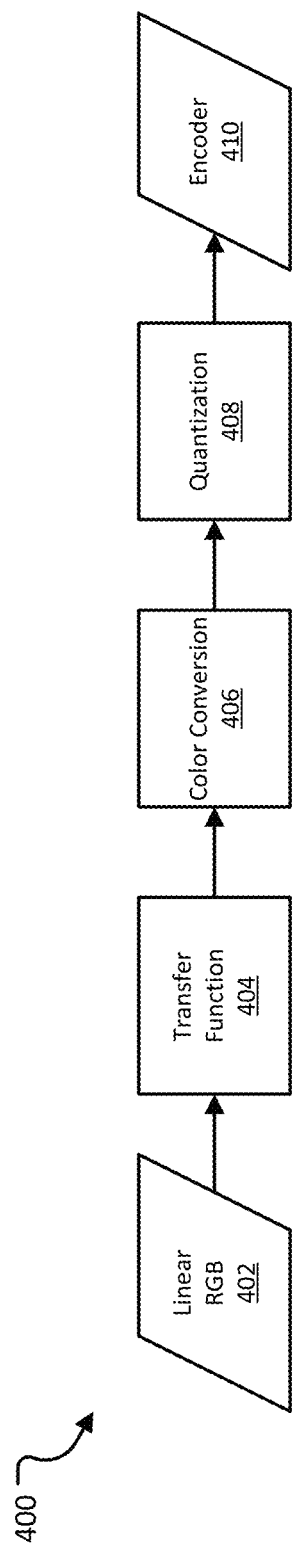
FIG. 4 includes a diagram illustrating an example of a process for converting high-precision linear RGB video data for purposes of encoding the video data.

FIG. 4 includes a diagram illustrating an example of a process 400 for converting high-precision linear RGB 402 video data for purposes of encoding the video data. The converted HDR data may have a lower precision and may be more easily compressed. The example process 400 includes a non-linear transfer function 404, which can compact the dynamic range, a color conversion 406 that can produce a more compact or robust color space, and a quantization 408 function that can convert floating point representations to integer representations. The output of the quantization 408 function can be input into an encoder 410, which can compress or encode the data to produce an encoded bitstream. The encoder 410 can use, for example, the AVC HEVC, or VP8/VP9/VP10 standards. The bitstream can be stored and/or transmitted.

In various examples, linear RGB 402 data, which can have a high dynamic range and a floating point representation, can be compacted using the non-linear transfer function 404. An example of a non-linear transfer function 404 is the perceptual quantizer defined in ST 2084. The output of the transfer function 404 can be converted to a target color space by the color conversion 406. The target color space can be one that is more suitable for compression, such as YCbCr. Quantization 408 can then be used to convert the data to an integer representation. The output of the quantization 408 can be provided to an encoder 410, which can produce an encoded bitstream from the data.

Figure 5:
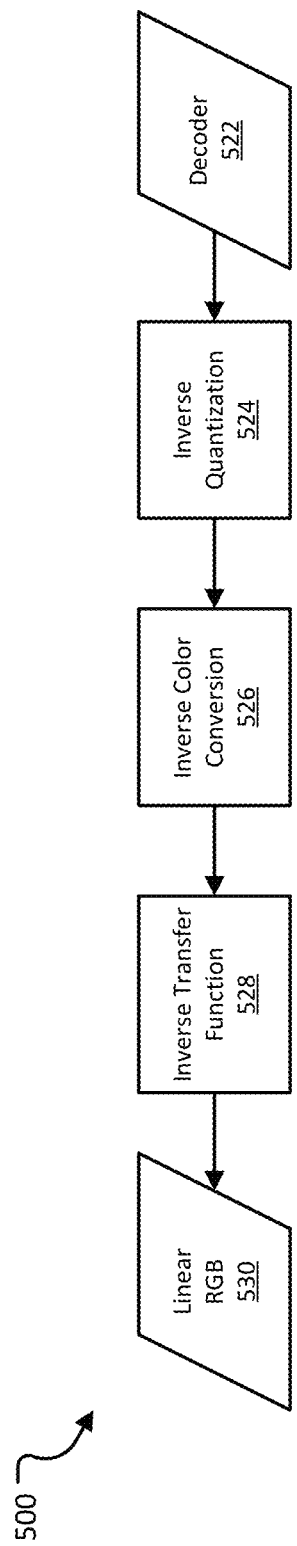
FIG. 5 includes a diagram illustrating an example of a process for restoring converted HDR video data, obtained from a decoded bitstream produced by a decoder.

FIG. 5 includes a diagram illustrating an example of a process 500 for restoring converted HDR video data, obtained from a decoded bitstream produced by a decoder 522. The uncompressed or decoded video signal can be transmitted to an end consumer device using, for example, a high-speed digital interface. Examples of consumer electronic devices and transmission mediums include digital televisions, digital cable, satellite or terrestrial set-top boxes, mobile devices, and related peripheral devices, such as Digital Versatile Disc (DVD) players and/or recorders, and other related decoding devices and consumer devices. In some examples, the decoder 522 can perform steps of the process 500. In some examples, an end consumer electronic device can perform steps of the process 500.

The process 500 can operate on HDR video data that was converted according to the process 400 of FIG. 4, and can approximately produce the high-precision linear RGB 402 video data that was input into the process 400. As illustrated in FIG. 5, the process 500 includes inverse quantization 524 (e.g., for converting integer representations to floating point representations), an inverse color conversion 526, and an inverse transfer function 528.

The inverse quantization 524 of FIG. 5 includes performing the inverse of the computations performed for the quantization 408 of FIG. 4. Similarly, the inverse color conversion 526 includes performing the inverse of the computations performed for the color conversion 406, and the inverse transfer function 528 includes performing the inverse of the computations performed for the transfer function 402. For the sake of clarity, the discussion that follows provides examples of the transfer function 404, the color conversion 406, and the quantization 408, with the understanding that, unless provided otherwise, these examples also apply to the inverse transfer function 528, inverse color conversion 426, and inverse quantization 524. Additionally, the order of the steps of the example processes 400 and 500 are illustrative of the order in which the steps can be performed. In other examples, the steps can occur in a different order. For example, the color conversion 406 can precede the transfer function 404. In another example, the inverse color conversion 526 can be performed after the inverse transfer function 5284. In other examples, additional processing can also occur. For example, spatial sub sampling may be applied to color components.

The transfer function can be used to map the digital values in an image to and from optical energy. Optical energy, which is also referred to as optical power, is the degree to which a lens, mirror, or other optical system converges or diverges light. The transfer function can be applied to the data in an image to compact the dynamic range. Compacting the dynamic range may enable video content to represent the data with a limited number of bits. The transfer function can be a one-dimensional, non-linear function that can either reflect the inverse of the electro-optical transfer function (EOTF) of an end consumer display (e.g., as specified for SDR in BT.709), or approximate the human visual system's perception of brightness changes (e.g., as a provided for HDR by the perceptual quantizer (PQ) transfer function specified in ST 2084). An electro-optical transfer function describes how to turn digital values, referred to as code levels or code values, into visible light. For example, an EOTF can map the code levels back to luminance values. The inverse process of the electro-optical transform is the optical-electro transform (OETF), which can produce code levels from luminance.

Figure 6:
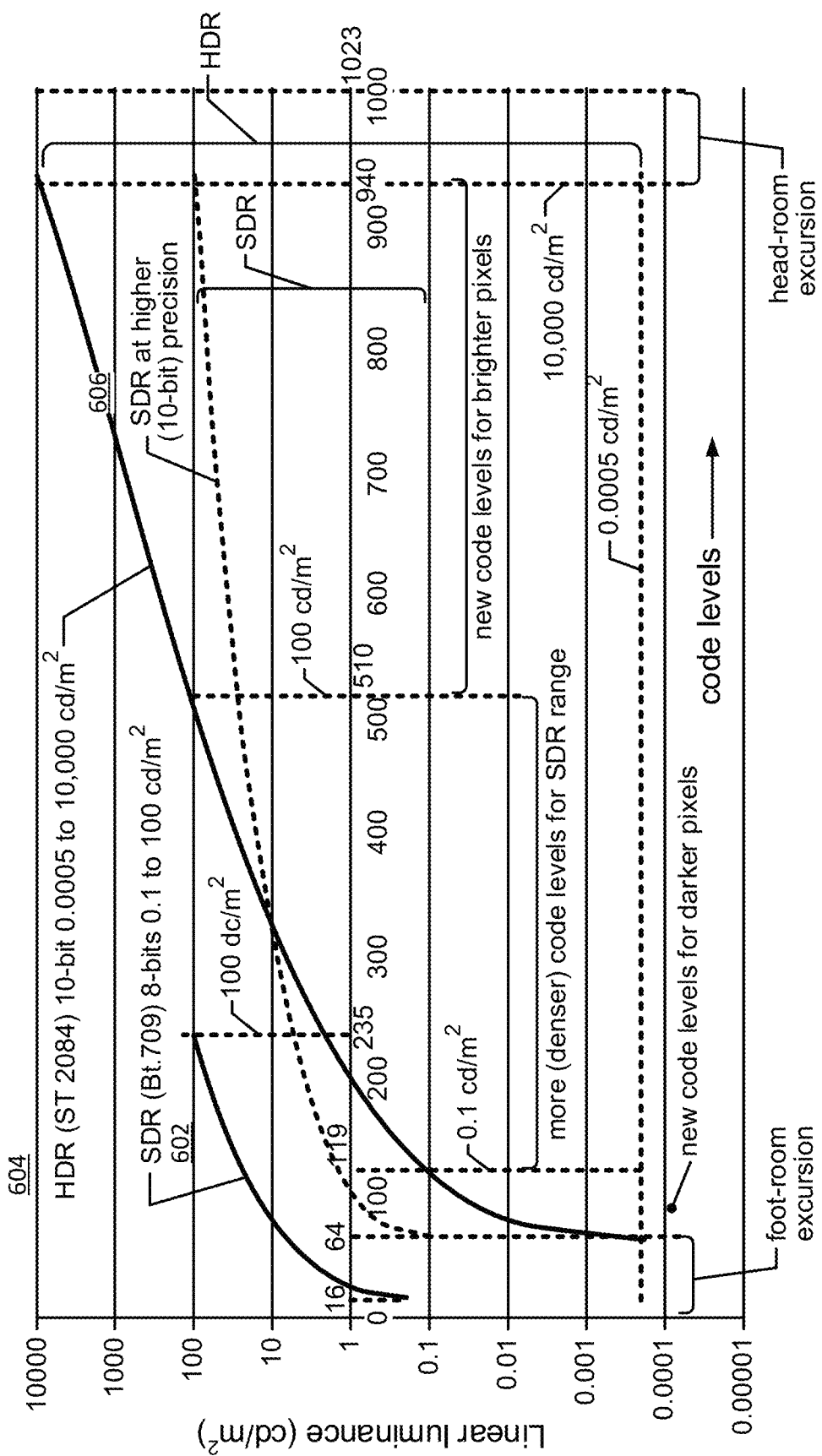
FIG. 6 includes a chart that illustrates examples of luminance curves produced by transfer functions.

FIG. 6 includes a chart that illustrates examples of luminance curves produced by transfer functions. Each curve charts a luminance value at different code levels. Curves for the transfer functions defined by BT.709 (curve 602) and ST 2084 (curve 604) are illustrated, as well as a representative curve 606 for 10-bit SDR data. FIG. 6 also illustrates dynamic ranges enabled by each transfer function. In other examples, curves can separately be drawn for red (R), green (G), and blue (B) color components.

ST 2084 provides a transfer function that can more efficiently support a higher dynamic range data. The transfer function of ST 2084 is applied to normalized, linear R, G, and B values, which produces non-linear representations, referred to herein as R', G', and B'. ST 2084 further defines normalization by NORM=10000, which is associated with a peak brightness of 10,000 nits. The R', G', and B' values can be calculated as follows:

$$R'=\text{PQ\_TF}(\max(0,\min(R/\text{NORM},1)))$$

$$G'=\text{PQ\_TF}(\max(0,\min(G/\text{NORM},1)))$$

$$B'=\text{PQ\_TF}(\max(0,\min(B/\text{NORM},1))) \quad (1)$$

In Equation (1), the transfer function, PQ_TF, is defined as follows:

$$\text{PQ\_TF}(L) = \left(\frac{c_1 + c_2 L^{m_1}}{1 + c_3 L^{m_1}}\right)^{m_2}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2932}{4096} \times 32 = 18.6875$$

Figure 7:
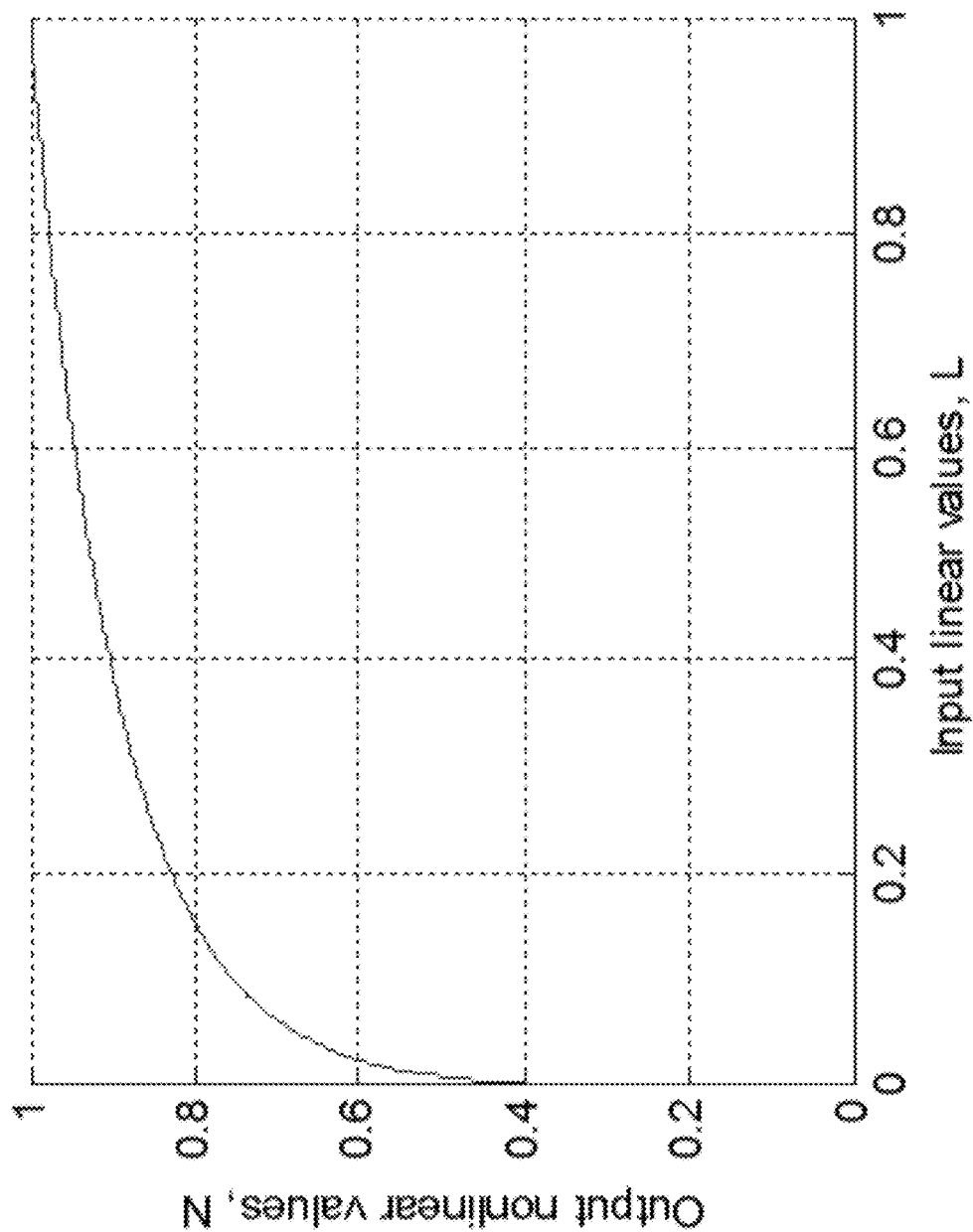
FIG. 7 includes a graph illustrating an example of input values to PQ_TF.

FIG. 7 includes a graph illustrating an example of the input values to PQ_TF (e.g., linear color values) normalized to a range of 0 . . . 1 and corresponding output values (e.g., non-linear color values). As illustrated in this graph, 1% of the dynamic range of the input signal (e.g., representing low illumination) is converted to 50% of the dynamic range of the output signal.

The electro-optical transfer function can be defined as a function with a floating point accuracy. By having floating point accuracy, it is possible to avoid introducing errors into a signal that incorporates the non-linearity of the function when an inverse function (e.g., an optical-electro transfer function) is applied. This inverse transfer function specified by ST 2048 is as follows:

$$R=10000*\text{inversePQ\_TF}(R')$$

$$G=10000*\text{inversePQ\_TF}(G')$$

$$B=10000*\text{inversePQ\_TF}(B') \quad (2)$$

In Equation (2), the inverse transfer function, inversePQ_TF, is defined as follows:

$$\text{inversePQ\_TF}(N) = \left( \frac{\max[(N^{1/m_2} - c_1), 0]}{c_2 - c_3 N^{1/m_2}} \right)^{1/m_1}$$

$$m_1 = \frac{2610}{4096} \times \frac{1}{4} = 0.1593017578125$$

$$m_2 = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2932}{4096} \times 32 = 18.6875$$

With floating point accuracy, sequential application of an EOTF and OETF can provide near exact reconstruction without errors. Representation of the linear color data using an EOTF, however, may not be optimal for streamlining or broadcasting services. Additional processing, as described below, can produce a more compact representation of the non-linear R'G'B' data, which has fixed-bit accuracy.

Other transfer functions and inverse transfer functions have been defined. A video coding system can use one of these other transfer functions and inverse transfer functions instead of or in addition those provided by ST 2084.

Color conversion can reduce the size of the color space of the linear RGB input. Image capture systems often capture images as RGB data. The RGB color space, however, can have a high degree of redundancy among color components. RGB is thus not optimal for producing a compact representation of the data. To achieve a more compact and more robust representation, RGB components can be converted to a more uncorrelated color space, such as YCbCr, which may be more suitable for compression. The YCbCr color space separates the brightness in the form of luminance and color information in different un-correlated components, including luma (Y), chroma-blue (Cb), and chroma-red (Cr).

The YCbCr color space is one target color space used by BT.709. BT.709 provides the follow conversion for the non-linear R', G', and B' values to a non-constant luminance representation, Y', Cb, and Cr:

$$Y' = 0.2126 * R' + 0.7152 * G' + 0.0722 * B' \quad (3)$$

$$Cb = \frac{B' - Y'}{1.8556}$$

$$Cr = \frac{R' - Y'}{1.5748}$$

The conversion provided by Equation (3) can also be implemented using the following approximate conversions, which avoids the division for the Cb and Cr components:

$Y'=0.212600*R'+0.715200*G'+0.072200*B'$ $Cb=-0.114572*R'-0.385428*G'+0.500000*B'$ $Cr=0.500000*R'-0.454153*G'-0.045847*B'$ (4)

The BT.2020 specifies the following conversion process from R', G', and B' to Y, Cb, and Cr:

$$Y' = 0.2627 * R' + 0.6780 * G' + 0.0593 * B' \quad (5)$$

$$Cb = \frac{B' - Y'}{1.8814}$$

$$Cr = \frac{R' - Y'}{1.4746}$$

The conversion provided by Equation (5) can also be implemented using the following approximate conversion, which avoids the division for the Cb and Cr components:

$Y'=0.262700*R'+0.678000*G'+0.059300*B'$ $Cb=-0.139630*R'-0.360370*G'+0.500000*B'$ $Cr=0.500000*R'-0.459786*G'-0.040214*B'$ (6)

In these and other examples, the input color space (e.g., the R'G'B' color space) an the output color space (e.g., the Y'CbCr color space) remain normalized. Thus, for input values normalized in the range of 0 . . . 1 the output values will also be mapped to the range of 0 . . . 1. In some examples, values of Cb and Cr are normalized in the range of −0.5 to 0.5, where Cb and Cr values both equal to 0 indicate grey colors. Color transforms implemented with floating point accuracy can approach perfect reconstruction, resulting in a lossless process.

After color conversion, the input data, now in the target color space, may still be represented with a high-bit depth (e.g., with floating point accuracy) and may be lossless. This degree of accuracy, however, may be redundant and excessive for most consumer electronics applications. In some examples, 10-bit to 12-bit accuracy, in combination with the PQ transfer function, may be sufficient for the HDR data to have 16 f-stops with a distortion that is just below what is noticeable by human vision. HDR data with 10-bit accuracy can further be coded by most video coding systems.

Quantization can convert the data to a target bit depth. Quantization is a lossy process, meaning that some information is lost, and may be a source of inaccuracy in the output HDR data.

The following equations provide an example of quantization that can be applied to code words in the target color space. In this example, input values for Y, Cb, and Cr that have floating point accuracy can be converted into fixed bit depth values BitDepthY for the Y value and BitDepthC for the chroma values (Cb and Cr).

$D_{Y'}=\text{Clip1}_Y(\text{Round}((1<<(\text{BitDepth}_Y-8))*(219*Y'+16)))$ $D_{Cb}=\text{Clip1}_C(\text{Round}((1<<(\text{BitDepth}_C-8))*(224*Cb+128)))$ $D_{Cr}=\text{Clip1}_C(\text{Round}((1<<(\text{BitDepth}_C-8))*(224*Cr+128)))$ (7)

In the above:
Round(x)=Sign(x)*Floor(Abs(x)+0.5)
Sign (x)=−1 if x<0, 0 if x=0, 1 if x>0
Floor(x) the largest integer less than or equal to x
Abs(x)=x if x>=0, −x if x<0
Clip1Y(x)=Clip3(0, (1<<BitDepthY)−1, x)
Clip1C(x)=Clip3(0, (1<<BitDepthC)−1, x)
Clip3(x,y,z)=x if z<x, y if z>y, z otherwise In some cases, converting video data with a large color volume to video data with a more compact color volume can result in dynamic range changes. These dynamic range changes may be visible in the reconstructed video as distortions, such as color mismatches or color bleeding, among other examples. Dynamic Range Adjustment (DRA) is a technique for compensating for the dynamic range changes, and lessening possible distortions. DRA was proposed in "Dynamic Range Adjustment SEI to enable High Dynamic Range video coding with Backward-Compatible Capability," D. Rusanovskyy, A. K. Ramasubramonian, D. Bugdayci, S. Lee, J. Sole, and M. Karczewicz, VCEG document COM16-C 1027-E, September 2015, which is hereby incorporated by reference in its entirety and for all purposes.

In various examples, DRA can be implemented using a piece-wise linear function f(x) that is defined for a group of non-overlapping dynamic range partitions, which are also referred to herein as ranges, where each range partition or range includes a set of input values x (e.g., input color values). The ranges are represented herein by $\{R_i\}$, where i is an index of each respective range and i=0 . . . N−1, inclusive, with N being the total number of ranges used for defining the DRA function. As an example, it can be assumed that the ranges are defined by a minimum and a maximum x value that belong to the each respective range $R_i$; for example for the input values $[x_i, x_{i+1}-1]$, $x_i$ and $x_{i+1}$ can denote minimum value of the ranges Ri and R(i+1) respectively. Applied to the Y color component of the video (e.g., the luma value), the DRA function $S_y$ can be defined using a scale value $S_{y,i}$ and an offset value $O_{y,i}$, which can be applied to every input value (that is, for every $x \in [x_i, x_{i+1}-1]$). The DRA function can thus be defined as the set of scale and offset values for each input value, or $S_y = \{S_{y,i}, O_{y,i}\}$.

Using this definition for the DRA function, for any range Ri and for every $x \in [x_i, x_{i+1}-1]$, an output value X can be calculated as follows:

$$X = S_{y,i} \times (x - O_{y,i}) \quad (8)$$

An inverse DRA mapping for the luma component Y can be conducted at a decoder. In this case, the DRA function $S_y$ can be defined by the inverse of the scale value $S_{y,i}$ and the offset value $O_{y,i}$. The inverse scale value and offset value can be applied to every $X \in [X_i, X_{i+1}-1]$.

Using this definition of the inverse DRA function, for any range Ri and for every output value $X \in [X_i, X_{i+1}-1]$, a reconstructed x value can be calculated as follows:

$$X = X/S_{y,i} + O_{y,i} \quad (9)$$

A DRA mapping process (e.g., for encoding purposes) can also be defined for the chroma components, Cb and Cr. In the following example, u denotes a sample of a Cb color component that belongs to the range Ri. In this example, $u \in [u_i, u_{i+1}-1]$. The DRA function $S_u$ for a chroma sample can also be defined using a scale value $S_{u,i}$ and an offset value $O_{u,i}$, such that $S_u = \{S_{u,i}, O_{u,i}\}$. An output value U can thus be calculated as follows:

$$U = S_{u,i} \times (u - O_{y,i}) + \text{Offset} \quad (10)$$

In Equation (10), Offset is equal to $2^{(bitdepth-1)}$ and denotes a bi-polar Cb, Cr signal offset.

An inverse DRA mapping for the chroma components Cb and Cr can also be defined and can be performed at a decoder. In the following example, U denotes a sample of a remapped Cb color component from the range Ri, where $U \in [U_i, U_{i+1}-1]$. In this example, the Cb component can be reconstructed using the following equation:

$$u = (U - \text{Offset})/S_{u,i} + O_{y,i} \quad (11)$$

In Equation (11), Offset is equal to $2^{(bitdepth-1)}$ and denotes a bi-polar Cb, Cr signal offset.

An additional technique for reducing distortion that can occur when modifying the color space of a video is Luma-driven Chroma Scaling (LCS). Luma-Driven Chroma Scaling was proposed in JCTVC-W0101 HDR CE2: Report on CE2.a-1 LCS, A. K. Ramasubramonian, J. Sole, D. Rusanovskyy, D. Bugdayci, and M. Karczewicz, which is hereby incorporated by reference in its entirety and for all purposes.

LCS is a technique by which chroma information (e.g., Cb and Cr samples) is adjusted by taking advantage of brightness information associated with a processed chroma sample. Similar to the DRA approach described above, LCS includes applying a scaling factor $S_u$ for the Cb component and a scaling factor $S_{v,i}$ for the Cr component. With LCS, however, instead of defining the DRA function as a piece-wise linear function (e.g., as $S_u = \{S_{u,i}, O_{u,i}\}$ for a set of ranges $\{R_i\}$ accessible by chroma values u or v as in Equations (3) or (4)), the LCS approach uses the luma value Y to derive a scale factor for the chroma sample. For example, mapping of the chroma sample u (or v) for purposes of encoding the video data can be performed using the following equation:

$$U = S_{u,i}(Y) \times (u - \text{Offset}) + \text{Offset} \quad (12)$$

The inverse LCS process, for decoding purposes, can be defined as follows:

$$u = (U - \text{Offset})/S_{u,i}(Y) + \text{Offset} \quad (13)$$

As a further example, for a given pixel located at (x, y), chroma samples Cb(x, y) and/or Cr(x, y) are scaled with a factor derived from a corresponding LCS function $S_{Cb}$ (or $S_{Cr}$) accessed using luma value Y'(x, y).

In the forward mapping process (e.g., when processing for encoding) for chroma samples, Cb (or Cr) values and an associated luma value Y' are taken as an input to the chroma scale function $S_{Cb}$ (or $S_{Cr}$) and Cb or Cr are converted into Cb' and Cr' as shown below in Equation (14).

$$Cb'(x,y) = S_{Cb}(Y(x,y)) \times Cb(x,y),$$

$$Cr'(x,y) = S_{Cr}(Y(x,y)) \times Cr(x,y) \quad (14)$$

On decoding, the inverse LCS process is applied, and reconstructed Cb' or Cr' are converted to Cb or Cr as shown below in Equation (15).

$$Cb(x, y) = \frac{Cb'(x, y)}{S_{Cb}(Y'(x, y))}$$

$$Cr(x, y) = \frac{Cr'(x, y)}{S_{Cr}(Y'(x, y))} \quad (15)$$

Figure 8:
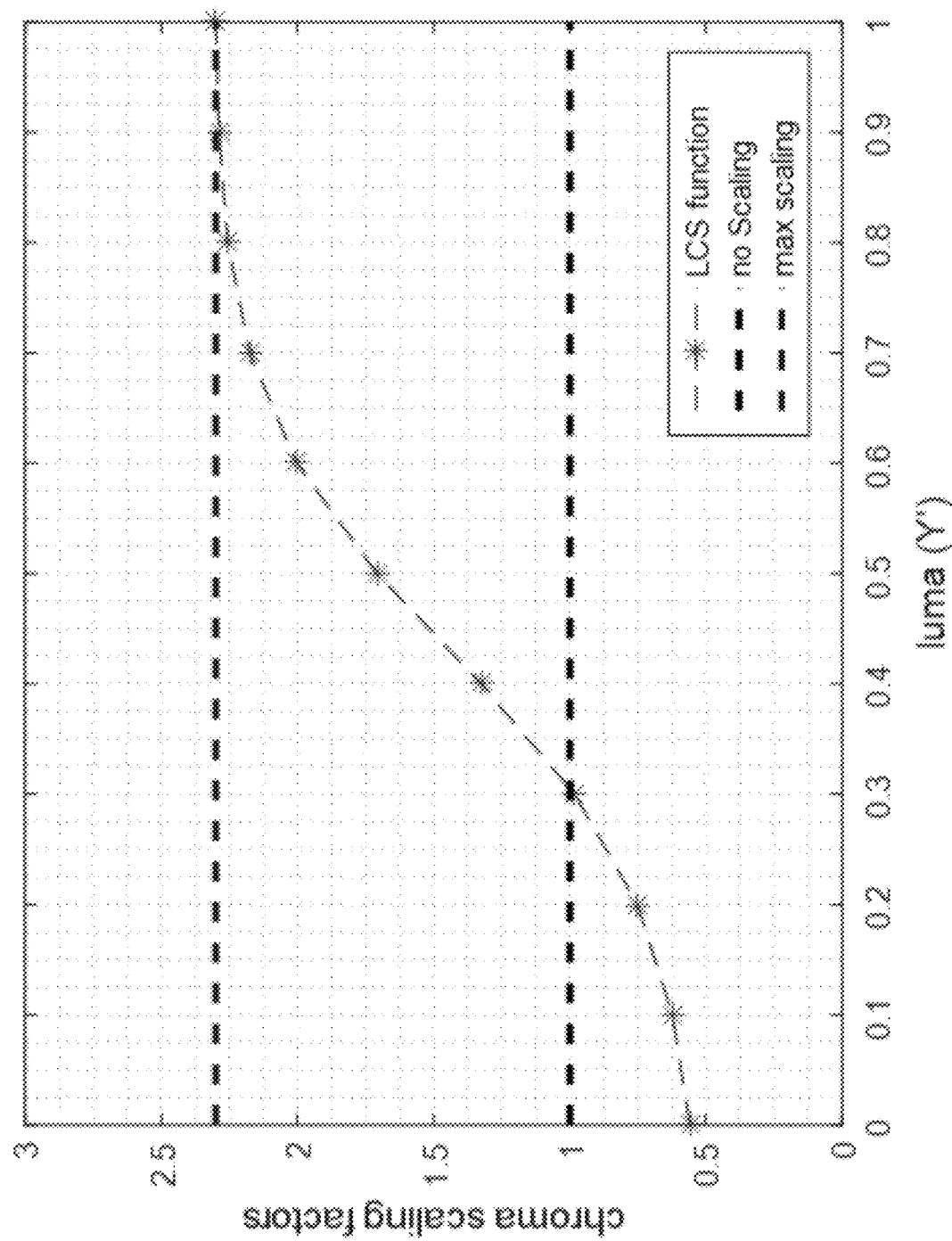
FIG. 8 includes a graph illustrating an example of an LCS function.

FIG. 8 includes a graph illustrating an example of an LCS function. In this example, chroma components of pixels that have a smaller luma value are multiplied with smaller scaling factors.

In various examples, DRA sample scaling can be related to the quantization parameters used in an encoding or decoding process. As discussed further below, a block-transform-based video coding process (such as HEVC), uses a scalar quantizer to adjust the compression ratio. Quantization can be applied to transform coefficients. The scalar quantizer can be controlled by a quantization parameter (QP), with the relationship between the QP and the scalar quantizer defined as follows:

$$\text{scalar} = \exp\left(\frac{QP}{6}\right) \times \log(2.0) \quad (16)$$

The relationship between the scalar quantizer and the QP value can be defined by the inverse function, as follows:

$$QP = \log 2(scalar) \times \quad (17)$$

The DRA technique discussed above effectively scales the pixel data. In view of transform properties, the DRA scaling can be mapped, for a large class of signals, to the scalar applied in the transform domain. For example, the following relationship can be defined:

$$dQP = \log 2(scaleDRA) \times 6 \quad (18)$$

In Equation (18), dQP is an approximate QP offset introduced by applying DRA to the input data.

In various examples, parameters that describe a piecewise linear function that can be used for Dynamic Range Adjustment can be signaled (e.g., encoded into) a bitstream. The encoded parameters can then be decoded at a decoder, which can use the parameters to reconstruct the piecewise linear function. To describe the piecewise linear function, the range of input values (which may be, in some examples, luma values) for the function can be divided into segments or ranges that each have a constant slope. The parameters for the piecewise linear function can then include values that describe the ranges (e.g., lengths of the ranges, a quantity of the ranges, etc.) and scale values (e.g., describing the slope of each range). Examples of signaling DRA parameters are described in "HDR CE6: Test 4.1 Reshaper from m37064," D. B. Sansli, A. K. Ramasubramonian, D. Rusanovskyy, J. Sole, and M. Karczewicz, JCTVC-W0103, San Diego, Calif., February, 2016, which is incorporated by reference herein in its entirety and for all purposes. The DRA parameters can be included, for example, in an SEI message, a slice header, and/or a parameter set (e.g., an SPS, a PPS, or another type of parameter set).

The following illustrates a partial example of a data structure that can be used to encode the parameters that describe a piecewise linear function. In various examples, the data structure can include other components that, for the sake of clarity, are not illustrated here. The values in the data structure can be applied, for example, to a group of video frames, to one video frame, and/or to a portion of a video frame:

```
pic_parameter_set_rbsp( )
    dra_enabled_flag
    if (dra_enabled_flag) {
        num_luma_dra_in_ranges
        for (i = 0; i <= num_luma_dra_in_ranges; i++)
            delta_luma_change_points[i]
        for (i = 0; i <= num_luma_dra_in_ranges; i++)
            delta_scale_val[i]
    }
```

In this example data structure, the dra_enabled_flag component can be used to indicate that Dynamic Range Adjustment is enabled. The num_luma_dra_in_ranges component can indicate the number of ranges into which the input values (which are luma values, in this example) have been divided. The delta_luma_change_points[i] component can indicate the length of each range, and the delta_scale_val[i] can indicate a scale value, which indicates a slope, for each range. In this example, the lengths of the ranges is indicated relative to the input values; that is, the lengths are indicates by a "change point" or input value where one range ends and another begins.

For some content, the ranges may be equal in length. In these cases, the number of bits needed to encode the piecewise linear function can be reduced. For example, the length of the ranges need not be indicated in the bitstream. Instead, a flag, referred to herein as "equal_ranges_flag," can be included in the above data structure, which indicates that the lengths of the ranges can be derived from a specified value (e.g., a bit depth of the color components or a value indicated in the bitstream, among other examples) and a number of ranges indicated in the bitstream. In this example, coding efficiency is improved because only the scale values and the number of ranges need to be signaled.

For some content, however, even signaling only the scale values and the number of ranges may add unnecessary bits to the bitstream. For example, in some cases, it may be known that the input values (e.g., the luma samples) are restricted to a specific range, either because the video was designed to have limited luma values or because an analysis of the histogram of the video so indicates. In this example, signaling scale values for ranges that are not occupied because the ranges fall outside the restricted range can result in unnecessary bits being added to the output bitstream.

Figure 9:
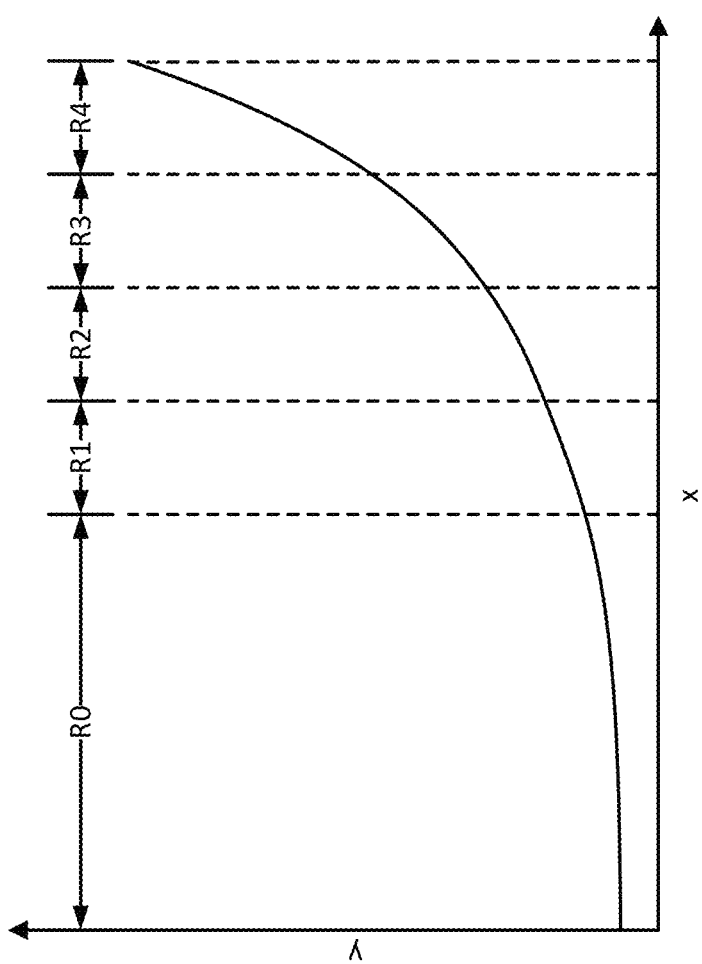
FIG. 9 includes a graph that plots a y-value for a range of input values of x, according to a piecewise linear function for dynamic range adjustment.

In other cases, the ranges of input values may be such that part of the range can be divided into segments or partitions of equal length, but one part or two parts of the range have a slope such that these parts cannot have the same length at the other ranges. FIG. 9 includes a graph that plots a y-value for a range of input values of x, according to a piecewise linear function for dynamic range adjustment. The x values can be luma values from pixels in a video frame, for example. In this example, the range of x values includes five ranges, R0, R1, R2, R3, and R4, that each have an approximately constant slope. As illustrated in this example, four of the ranges, R1, R2, R3, and R4 are of the same length, while one range, R0, has a different length.

The example data structure illustrated above can be used to encode the piecewise linear function illustrated in FIG. 9, but using this data structure can result in some redundant data being encoded. For example, the data structure can result in each of ranges R1, R2, R3 and R4 being individually encoded into the bitstream, and because each have a same length, the one length value will be encoded into the bitstream three times. In this example, more efficiency can be achieved if the common length value is only encoded into the bitstream once.

As another example, the data structure illustrated above can be used along with the equal_ranges_flag. In this example the range of x values into equal parts can be divided into equal parts, and the ranges each having the same length can be indicates using the equal_ranges_flag. In the example of FIG. 9, this would result in R0 being divided into three parts. In this case, however, redundant data is also encoded, in that the ranges that encompass R0 would each have a same scale value. More efficiency can be achieved if the common scale value can be encoded only once.

In various examples, a data structure such as is described above can be modified so that a piecewise linear function can be efficiently encoded when the range of input values for the function can be divided into ranges of equal lengths, can partially be divided into ranges or partitions of equal lengths, or cannot be divided into ranges of equal lengths. As in the example data structure above, information such as the lengths of the ranges or the start or end positions of the ranges need not be indicated in the data structure. Instead, these and other parameters can be derived at a decoder using a deterministic derivation process, as discussed further below.

In a first example, the data structure that can include an indicator that can indicate to a decoder that the ranges into which the input values have been divided includes a set of ranges that have a same length. The set of ranges may be referred to herein as the set of equal length ranges. The indicator is referred to in the example below as "equal_ranges_flag," and can be a 1-bit value. In this example, when the equal_ranges_flag is equal to zero, then the range of input values was not divided into any ranges having the same length, or may have been divided into a few ranges having the same length and a few having different lengths, with the ranges having the same length being discontinuous, being equal to or fewer than the number of ranges having different lengths, and/or being located between ranges having different lengths. In this example, each length of each range of input values is indicated in the data structure. In the examples below, the component used to indicate the lengths of the ranges is called "delta_luma_change_points," which can be an array having an index for each range of input values.

In the preceding example, when the equal_ranges_flag is set to 1, then either the all of range of input values has been divided into segments of equal length, or the range of input values has been divided into one set having the same length and one having a different length. In either of these cases, one component of the data structure can be used to indicate the length of the equal length segments. In the examples below, this component is referred to as "delta_luma_val."

In one example, the one range having a different length (which may be referred to herein as the unequal length range) is at the beginning of the range of input values. That is, as illustrated in FIG. 9, the unequal length range can include input values from the beginning of the range of input values, with the remaining input values being divided into equal lengths. In this example, the length of the unequal length range can be indicated using delta_luma_change_points[0] (e.g., index zero of the delta_luma_change_points component). When all the ranges have the same length (e.g., there is no unequal length range), then delta_luma_change_points[0] can indicate this length, such that no special handling or additional components are needed to distinguish between there being one unequal length range and no unequal length range. In some other examples, when all the ranges have the same length, delta_luma_change_points[0] need not be signaled and delta_luma_val can be used to derive the length of the equal ranges.

Continuing the first example, a decoder receiving the data structure can derive the lengths of the ranges (e.g., the delta_luma_change_points value for each range) using the delta_luma_val. For example, the delta_luma_val can indicate a difference between the end value and the start value of each of the equal length ranges.

As another example, delta_luma_val can specify the lengths of the equal length ranges relative to a fixed value that is the same at both the encoder and the decoder. For example, the fixed value can be a maximum value that the range of input values can have when all the ranges, including the unequal length range, have the same length. In this example, delta_luma_val can be used to indicate the difference between the fixed value (e.g., the maximum possible value of the input values) and the length of the equal length ranges. The delta_luma_val can be a signed value in this example. As an example, assuming that the contents of a video have a maximum luma value of 1000, that the values from 1 to 300 form one range, and that the values from 301 to 1000 form nine equal length ranges, the equal length ranges have a length of about 78. In this example, delta_luma_val can be set to 22, so that, at the decoder, the length of the equal length ranges can be determined as follows: (1000/10)−22=78. In this example, the number of bits needed to encode delta_luma_val may be less than when delta_lum_val indicates the absolute length of the equal length ranges.

As another example, delta_luma_val can be used to indicate a difference between the length of the equal length ranges if all of the ranges were contained in the equal length ranges and the actual length of the equal length ranges. In this example, the delta_luma_val can be a signed value. As an example, assuming a maximum luma value of 1000, that the values from 1 to 300 form an unequal length range, and that the remaining values form nine equal ranges each having a length of 78, then delta_luma_val can be set to −8, and the decoder can derive the length of the equal length ranges as follows: ((1000−300)/10)−(−8)=78. As in the previous example, in this example, the number of bits needed to encode delta_luma_val may be less than when delta_luma_val indicates the absolute length of the equal length ranges.

In a second example, there may be situations where the range of input values for the piecewise linear function can be divided into a set having equal lengths, a first range having a different length, and second range that may have the same length as the first range or may have a different length entirely. This may occur, for example, in a graph similar to the graph of FIG. 9, where the slope of the y-values initially changes little then changes more. In this second example, the data structure can include an indicator that can indicate whether the ranges include one unequal length range or two unequal length ranges. In the examples below, this indicator is referred to as "luma_range_scale_mode," which can be a 2-bit value. In this example, the equal_ranges_flag can also be used to indicate whether some or all of the ranges are equal in length.

In this second example, as in the previous example, delta_luma_change_points can indicate the lengths of all of the ranges when equal_ranges_flag indicates all the lengths are signaled (e.g., either because there are no equal length ranges, or because the equal length ranges are not arranged in a manner that enables the equal length ranges to be described as a group), and delta_luma_val can indicate the length of the equal length ranges when equal_ranges_flag indicates that there are equal_length_ranges. The delta_luma_change_points[0] can indicate the length of the first unequal length range where there is at least one unequal length range, and can be set to the length of the equal length ranges when all the ranges are of the same length.

When luma_range_scale_mode indicates that the ranges include two of unequal length, then delta_luma_change_points[1] can be used to indicate the length of the second unequal length range. In some examples, the second unequal length range may have the same scale value as the first unequal length range, in which case only one scale value needs to be signaled for both unequal length ranges.

Figure 10:
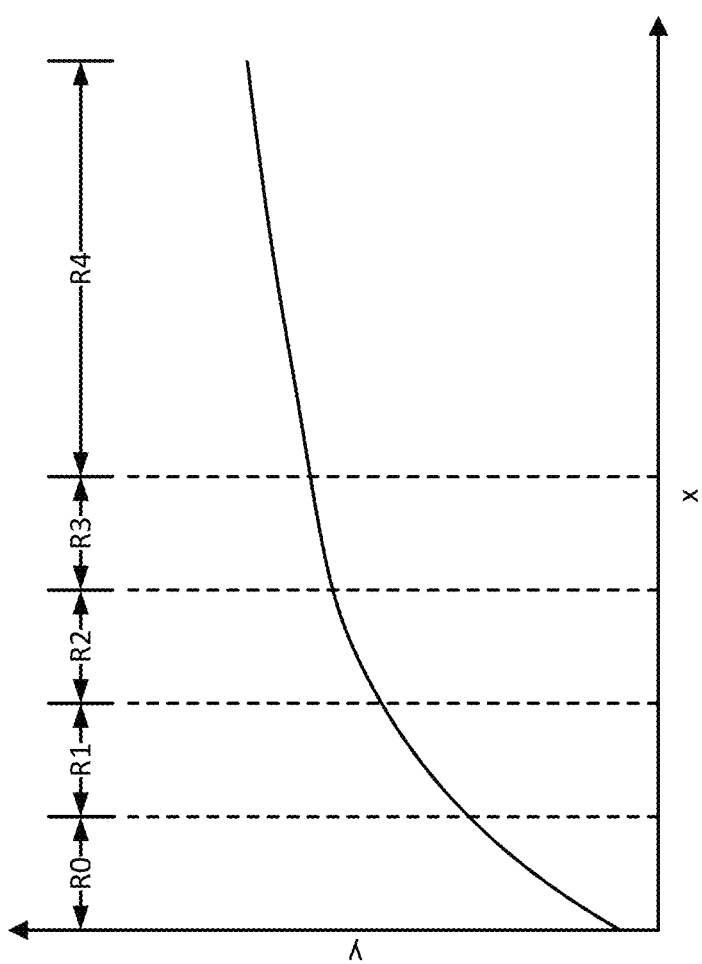
FIG. 10 includes a graph that plots a y-value for a range on x values, according to a piecewise linear function for dynamic range adjustment.

In some cases, the piecewise linear function may be such that the length and offset of the unequal length range need not be encoded, and can be derived at the decoder based on parameters for the equal length ranges. FIG. 10 includes a graph that plots a y-value for a range on x values, according to a piecewise linear function for dynamic range adjustment. In this example, the piecewise linear function can be divided into a set of equal length ranges (R0, R1, R2, and R3) and one range having a different length (R4). For this example, the data structure can include the equal_ranges_flag, to indicate that the range of input values have all or in part been divided into ranges having the same length. When the equal_ranges_flag indicates that all the range lengths are provided (e.g., either because there are no equal length ranges, or because the equal length ranges are not arranged in a manner that enables the equal length ranges to be described as a group), then a component of the data structure, referred to below as "range_length," can be used to indicate the length of the ranges. The range_length component can be an array that includes an index for each range.

When equal_ranges_flag indicates that the ranges include a set of ranges having the same lengths, then a value referred to below as "equal_range_length" can be used to indicate a total length of the equal length ranges, which can be computed by multiplying the number of equal length ranges by the length of each of the equal length ranges. As illustrated in the example of FIG. 10, the equal_range_length can also indicate the offset at which the unequal length range can be found. In this example, the unequal length range ends as the maximum possible value of the input values.

As an example, assuming a maximum luma value of 1000, that the unequal length range includes the values 701 through 1000, and that there are nine equal length ranges, then equal_range_length can have a value of 78. A decoder can then derive the combined length of the equal length ranges as follows: 78×9=702 or about 700. The decoder can further derive the length of the unequal length range as follows: 1000−700=300.

Several example implementations of the above-described methods will now be described. The following examples implement one or more of the examples described above.

The example implementations are illustrated using syntax structures and semantics. Changes to the syntax structure and semantics are indicated as follows: [[text within double brackets]] indicates deletions and underlined text indicates additions.

First Example

Syntax

| pic_parameter_set_rbsp( ) | Descriptor |
|---|---|
| ... | u(1) |
| dra_enabled_flag | u(1) |
| if( dra_enabled_flag ) { | |
|   num_scale_frac_bits | u(4) |
|   num_scale_int_bits | u(4) |
|   num_luma_dra_in_ranges | ue(v) |
|   equal_ranges_flag | u(1) |
|   delta_luma_change_points[ 0 ] | |
|   if( equal_ranges_flag ) | |
|     delta_luma_val | u(v) |
|   else | |
|     for( i = 1; i <= num_luma_dra_in_ranges; i++ ) | |
|       delta_luma_change_points[ i ] | u(v) |
|   for( i = 0; i < num_luma_dra_in_ranges; i++ ) | |
|     dra_scale_val[ i ] | u(v) |
|   cont_cb_qp_offset | s(v) |
|   cont_cr_qp_offset | s(v) |
|   base_qp | s(v) |
| } | |
| .... | |
| } | |

Semantics equal_ranges_flag equal to 0 specifies that the syntax element delta_luma_change_points[i] is signaled for i in the range of 1 to num_luma_dra_in_ranges, inclusive. equal_ranges_flag equal to 1 specifies that delta_luma_change_points[i] is signaled for i in the range of 1 to num_luma_d-ra_in_ranges, inclusive, is not signaled and is derived using delta_luma_val:

delta_luma_val is used to derive the value of the input ranges when equal_ranges_flag is set equal to 0. When not present, the value of delta_luma_val is inferred to be equal to 0. The number of bits used to signal delta_luma_val is equal to in_bit_depth.

Note that although in_bit_depth refers to the bit depth of the component samples, the numbers of bit used to signal delta_luma_val may be explicitly signaled or derived from other syntax elements in the bitstream.

When equal_ranges_flag is equal to 1, the value of delta_luma_change_points[i] is derived as follows for i in the range of 1 to num_luma_dra_in_ranges, inclusive:

delta_luma_change_points[$i$]=delta_luma_val

Alternatively, the signaled value of delta_luma_val is used to specify a difference between a fixed value of the range length and the actual range length. In such cases, delta_luma_val may be signaled as a signed number, e.g. coded as s(v) syntax element. An example of the derivation of delta_luma_change_points[i] is as follows:

deltaVal=(1<<in bit depth)/num_luma_dra_in_ranges−delta_luma_val delta_luma_change_points[$i$]=deltaVal An example of the derivation of the input ranges is given below, but it is to be understood that there may be other ways of deriving that is not specified in this disclosure:

inRanges[0]=delta_luma_change_points[0]

for($i$=1;$i$<=num_luma_dra_in_ranges;$i$++)

inRanges[$i$]=inRanges[$i$−1]+delta_luma_change_points[$i$]

Alternatively, the value of deltaVal is derived as follows:

deltaVal=((1<<in bit depth)−delta_luma_change_points[0])/num_luma_dra_in_ranges−delta_luma_val The inRanges[ ] so derived and dra_scale_val[ ] may be used to derive a look-up table that is used to perform the DRA mapping.

If inRanges[num_luma_dra_in_ranges] is less than (1<<in_bit_depth) the scale values corresponding to the sample values in the range of inRanges[num_luma_dra_in_ranges] to (1<<in bit depth), inclusive, may be derived to be equal to 0 or equal to inRanges[num_luma_dra_in_ranges−1].

The syntax elements cont_cb_qp_offset, cont_cr_qp_offset, and base_qp are used to derive the DRA parameters for mapping the chroma samples.

cont_cb_qp_offset is used to derive a scale value for the Cb container samples. The value of cont_cb_qp_offset is in the range of −24 to 24, inclusive.

cont_cr_qp_offset is used to derive a scale value for the Cr container samples. The value of cont_cb_qp_offset is in the range of −24 to 24, inclusive.

An example of scale value derived for Cb and Cr from cont_cb_qp_offset and cont_cr_qp_offset is as follows:

$$\text{scale}Cb = 2^{(-cont\_cb\_qp\_offset/6)}$$

$$\text{scale}Cr = 2^{(-cont\_cr\_qp\_offset/6)}$$

base_qp is used to derive additional scale value for chroma based on the chroma QP tables specified in the Table 8-10 of the HEVC standard. The value of base_qp is in the range of 0 to 51, inclusive.

In some embodiments cont_cb_qp_offset and cont_cr_qp_offset may be used to derive the scale values of any two components of the signal. The calculation of the scale values from cont_cb_qp_offset and cont_cr_qp_offset may be implemented in fixed-point arithmetic, or performed using look-up tables.

In some embodiments, the value of base_qp is signaled as a difference to a fixed number to reduce the number of bits needed to signal. In other embodiments, the scale value may be derived from base_qp using other tables defined similarly as Table 8-10, and the base_qp may be replaced by signaling an index to the table.

Second Example

This example is similar to example 1, except the signaling of syntax element specifying how the scale values are derived for ranges that do not have explicit signaling of dra_scale_val.
Syntax

| pic_parameter_set_rbsp( ) | Descriptor |
|---|---|
| ... | u(1) |
| dra_enabled_flag | u(1) |
| if( dra_enabled_flag ) { | |
| num_scale_frac_bits | u(4) |
| num_scale_int_bits | u(4) |
| num_luma_dra_in_ranges | ue(v) |
| equal_ranges_flag | u(1) |
| delta_luma_change_points[ 0 ] | u(v) |
| luma_range_scale_mode | u(2) |
| if( luma_range_scale_mode > 0 ) | |
| delta_luma_change_points[ 1 ] | u(v) |
| if( equal_ranges_flag ) | |
| delta_luma_val | u(v) |
| Else | |
| for( i = ( luma_range_scale_mode ? 2 : 1 ); i <= num_luma_dra_in_ranges; i++ ) | |
| delta_luma_change_points[ i ] | u(v) |
| for( i = ( luma_range_scale_mode ? 1 : 0 ); i < num_luma_dra_in_ranges; i++ ) | |
| dra_scale_val[ i ] | u(v) |
| cont_cb_qp_offset | s(v) |
| cont_cr_qp_offset | s(v) |
| base_qp | s(v) |
| } | |
| .... | |
| } | |

Semantics luma_range_scale_mode is used to specify the derivation of scale value dra_scale_val[1]. When luma range scale mode is equal to 1, the syntax element dra_scale_val[1] is set equal to (1<<num_scale_frac_bits). When luma_range_scale_mode is equal to 2, the syntax element dra_scale_val[1] is set equal to 0. When luma_range_scale_mode is equal to 3, the syntax element dra_scale_val[1] is set equal to dra_scale_val[2].

The value of delta_luma_change_points[i] may be derived as follows for i in the range of 2 to num_luma_dra_in_ranges, inclusive, or using the value delta_luma_val:

deltaVal=((1<<in bit depth)−delta_luma_change_points[0]−delta_luma_change_points[1])/num_luma_dra_in_ranges delta_luma_change_points[i]=deltaVal In some alternatives, the value of luma_range_scale_mode may not affect the relation of equal_ranges_flag and delta_luma_change_points[1].

In other alternatives, the syntax element delta_luma_change_points[0] may not be signaled.

The value of luma_range_scale_mode is described here to indicate how the value of scale corresponding to one range value is derived, or how the DRA parameters are derived based on the value. It is to be understood that similar syntax elements may also be specified for other ranges.

Third Example

This example can be used when a set of equal length ranges numerically precede an unequal length range, as illustrated in FIG. 10.
Syntax

| pic_parameter_set_rbsp( ) | Descriptor |
|---|---|
| ... | u(1) |
| dra_enabled_flag | u(1) |
| if( dra_enabled_flag ) { | |
| dra_global_offset_value | u(v) |
| luma_change_points[ 0 ] | u(v) |
| num_dra_ranges | ue(v) |
| equal_ranges_flag | u(1) |
| if( equal_ranges_flag ) | |
| equal_range_length | u(v) |
| else | |
| for( i = 1; i <= num_luma_dra_in_ranges; i++ ) | |
| range_length[ i ] | u(v) |
| for( i = 0; i < num_luma_dra_in_ranges; i++ ) | |
| dra_scale_val[ i ] | u(v) |
| cont_cb_qp_offset | s(v) |
| cont_cr_qp_offset | s(v) |
| base_qp | s(v) |
| } | |
| .... | |
| } | |

Semantics num_dra_ranges specifies the number of ranges defining the DRA function dra_global_offset_value specifies an x value where the DRA function results in y=0, and is used to derive other parameters of the DRA (e.g. a local offset for range R0).

luma_change_points[0] specifies the starting x value where the ranges are signaled using an equal range length or specifies the range length. The value of luma_changes_points[0] can be in the range of 0 to 1023, inclusive.

In one alternative, the following constraint is added:

The value of luma_change_points[0] can be greater than or equal to dra_global_offset_value.

equal_ranges_flag equal to 1 specifies that the DRA function is defined through equal length ranges.

equal range length specifies the length of all of the equal length ranges that define the DRA function.

If delta_luma_change_points[0]>dra_global_offset_value, the DRA function may need to be defined with an additional range, aka R[−1], parameters of which are not signaled, but may be derived at the decoder side as follows:

length of the range $R[-1]$=delta_luma_change_points[0]−dra_global_offset_value

A piece-wise linear (PWL) scale for the range $R[-1]$= scale [0], is a scale value signaled for neighboring range, parameters of which have been signaled, namely range R[0].

If it is not possible to fully define the DRA function for all of the possible values of x, e.g. num_dra_ranges*equal_range_length<MAX_X, the DRA function may be defined with an additional range, a.k.a. R[num_dra_ranges], parameters of which are not signaled, but may be derived at the decoder side as follows:

length of the range $R[\text{num\_dra\_ranges}]$=MAX_X−num_dra_ranges*equal_range_length, where MAX_X indicates a maximum value that the input component x may take. In some embodiments, the values of MAX_X may be determined after accounting for other ranges that are not signaled. For example, if the maximum value of input x is 1023, and delta_luma_change_points[0] is signaled, MAX_X is equal to 1024−delta_luma_changes_points[0].

PWL scale for the range R[num_dra_ranges]=scale [num_dra_ranges−1], is a scale value signaled for a neighboring range, parameters of which have previously been signaled, namely range R[num_dra_ranges−1].

FIG. 11 includes a flowchart that illustrates an example of a process 1100 for encoding video data. The process 1100 can be implemented, for example, by an encoding device that includes a memory and a processor. In this example, the memory can be configured to store video data, and the processor can be configured to perform the steps of the process 1100 of FIG. 11. For example, the encoding device can include a non-transitory computer-readable medium that can store instructions that, when executed by the processor, can cause the processor to perform the steps of the process 1100. In some examples, the encoding device can include a camera for capturing video data.

At step 1102, the process 1100 includes obtaining video data, wherein, for a portion of a video frame of the video data, the video data includes parameters describing a piecewise linear function for dynamic range adjustment of colors in the portion of the video frame, wherein the parameters divide a range of input values to the piecewise linear function into multiple of non-overlapping ranges, wherein the of non-overlapping ranges includes a first range having a first length and a set of ranges each having a second length, and wherein the first length is different from the second length. In some examples, the portion of the video frame includes less than all of a video frame. In some examples, the portion of the video frame includes all of a video frame. In some examples, the parameters that describe the piecewise linear function can apply to more than one video frame.

In some examples, the range of input values are luma values from pixels in the portion of the video frame. In these examples, the chroma values can be derived from the parameters. In these and other examples, the length of a range can indicate a number of luma values, of the possible luma values in the portion of the video frame, that are included the range.

In some examples, the first range includes a first set of input values from a beginning of the range of input values. In these examples, the set of ranges include a second of set input values, from the range of input values, that follow the first set of input values.

At step 1104, the process 1100 includes generating a data structure for the parameters. The data structure can include components such a value indicating the number ranges in the non-overlapping ranges and a scale factor for each of the ranges, and other information, as described below.

At step 1106, the process 1100 includes setting an indicator in the data structure to indicate that the non-overlapping ranges includes the set of ranges each having the second length. In some examples, all of the non-overlapping ranges have the same length (e.g., the first length is the same as the second length), in which case the steps that follow also apply. In other examples, when the non-overlapping ranges do not include ranges having a same length, or have ranges of the same length that cannot be grouped together, then the steps that follow do not apply, and each of the lengths is indicated in the data structure.

At step 1108, the process 1100 includes setting a first value in the data structure to indicate the second length. In some examples, the first value indicates the second length as a difference between an end value and a start value of each of the set of ranges. In some examples, the first value indicates the second length by indicating a difference between a fixed value and the second length. For example, the fixed value can be a maximum possible value for range of input values, or can be a value included in the data structure. In this example, the lengths of the set of ranges can be computed by dividing the fixed value by the total number of ranges (e.g., the number of ranges in the set of ranges plus the first range) and then subtracting the first value. In some examples, the lengths can be computed by subtracting the length of the first range (which can be provided in the data structure) from the fixed value and dividing the result by the total number of ranges, and then subtracting the first value.

In some examples, the first value is equal to a number of ranges in the set of ranges multiplied by the second length. In these examples, the first value is thus the sum of the lengths of the set of ranges. Additionally, in some examples, the first value can indicate an offset within the range of input values where the first range starts. For example, the set of ranges can include a first set of input values from a beginning of the range of input values, and the first range can include a second set of input values, from the range of input values, that follow the first set of input values. In this example, the first value can indicate where the second set of input values start.

In some examples, the process 1100 can include setting a second value in the data structure to indicate the first length. In some examples, the second value is not included in the data structure, and is instead derived from other values in the data structure. For example, when the first value indicates an offset within the range of input values, then the first length can be determined by subtracting the offset from a maximum input value.

At step 1110, the process 1100 includes generating encoded video data from the video data, wherein the data structure is included with the encoded video data. Generating the encoded video data can include performing steps as are discussed below with respect to FIG. 13. In some examples, the data structure can be included in an SEI message, which can be incorporated into the encoded video data or can be provided separately. The SEI message can apply the parameters in the data structure to a group of video frames, one video frame, or a slice of a video frame. In some examples, the data structure can be included in a slice header or a parameter set, such as a sequence parameter set, a picture parameter set, a video parameter set, or another type of parameter set. In this example, the parameters in the data structure can be applied to the portion of the video data to which the slice header or parameter set applies, which can be a slice from a video frame, a whole video frame, or a group of video frames.

In some examples, the non-overlapping ranges include a second range having a third length, which is different from the second length. In this example, the non-overlapping ranges thus include two ranges whose lengths are not the same as the lengths of the set of ranges. In this example, the process 1100 of FIG. 11 can further include setting a second indicator in the data structure to indicate that the non-overlapping ranges include the first range and the second range. The process can also include setting a third value in the data structure to indicate the third length.

Figure 12:
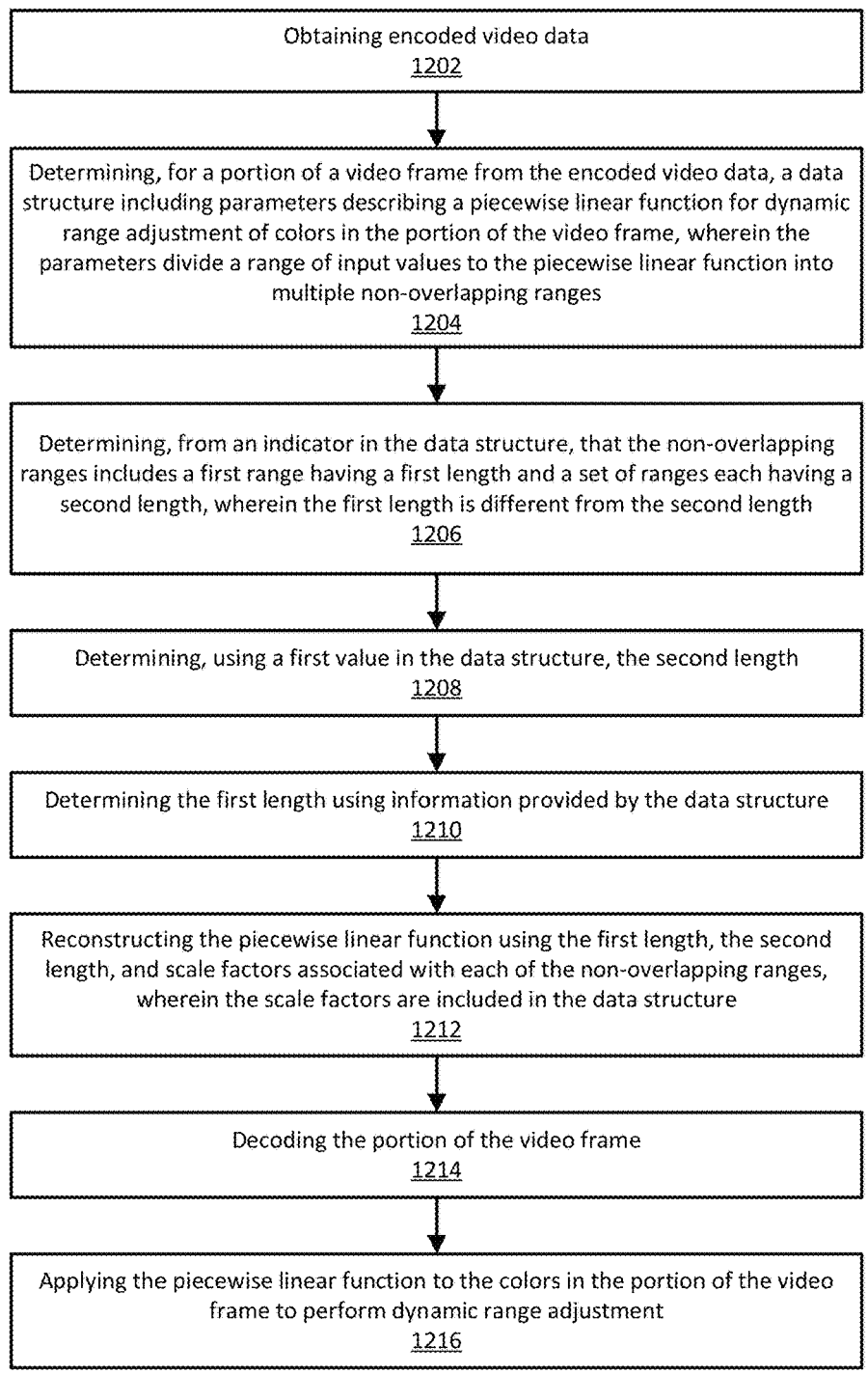
FIG. 12 includes a flowchart illustrating an example of a process for decoding video data.

FIG. 12 includes a flowchart illustrating an example of a process 1200 for decoding video data. The process 1200 can be implemented, for example, by a decoding device that includes a memory and a processor. In this example, the memory can be configured to store encoded video data, and the processor can be configured to perform the steps of the process 1200 of FIG. 12. For example, the decoding device can include a non-transitory computer-readable medium that can store instructions that, when executed by the processor, can cause the processor to perform the steps of the process 1200. In some examples, the decoding device can include a camera for capturing video data. In some examples, the decoding device can include a display for displaying decoded video data. In some examples, the decoding device is a mobile device with a camera for capturing video data and a display for displaying the video data.

At step 1202, the process 1200 includes obtaining encoded video data. The encoded video data can be obtained, for example, from a storage location in a memory of the decoding device. Alternatively or additionally, the encoded video data can be obtained from a storage location external to the decoding device, such as a locally attached hard drive or other storage device. Alternatively or additionally, the encoded video data can be obtained from a network location.

At step 1204, the process 1200 includes determining, for a portion of a video frame from the encoded video data, a data structure including parameters describing a piecewise linear function for dynamic range adjustment of colors in the portion of the video frame, wherein the parameters divide a range of input values to the piecewise linear function into multiple non-overlapping ranges. The portion of the video frame can be less than all of one video frame, a whole video frame, or a group of video frames. In some examples, the data structure is determined from an SEI message incorporated into the encoded video data or provided with the encoded video data. In these examples, the parameters in the SEI message can be applied to a group of video frames, one video frame, or a slice of a video frame. In some examples, the data structure is determined from a slice header or a parameter set, such as a sequence parameter set, a picture parameter set, a video parameter set, or another type of parameter set. In this example, the parameters in the data structure can be applied to the portion of the video data to which the slice header or parameter set applies, which can be a slice from a video frame, a whole video frame, or a group of video frames.

At step 1206, the process 1200 includes determining, from an indicator in the data structure, that the non-overlapping ranges include a first range having a first length and a set of ranges each having a second length, wherein the first length is different from the second length.

The indicator can, for example, indicate the presence of the set of ranges in the non-overlapping ranges. In some examples, determining that the non-overlapping ranges include a first range is based on a second value in the data structure that provides the first length. In some examples, all of the ranges are the same length, in which case the first length can be indicated in the structure as the same as the second length. In some examples, none of the ranges are the same length, or it is not possible to describe the ranges that are of the same length as a group. In these examples, the ranges of each of the lengths of the ranges is included in the data structure, and the steps that follow do not apply.

In some examples, a second value in the data structure provides the first length. In these examples, the process can further include determining, from an index associated with the second value, that the first range includes a first set of input values from a beginning of the range of input values, and that the set of ranges include a second set of input values, from the range of input values, that follow the first set of input values.

At step 1208, the process 1200 includes determining, using a first value in the data structure, the second length. In some examples, the first value provides (e.g., is equal to) the second length. In some examples, the first value indicates the second length by indicating a difference between a fixed value and the first length. In some examples, the fixed value can be a maximum possible value for range of input values, or can be a value included in the data structure. In this examples, the decoding device can determine the second length by dividing the fixed value by the total number of ranges (e.g., the number of ranges in the set of ranges plus the first range) and then subtracting the first value. In some examples, the decoding device can determine the second length by subtracting the length of the first range (which can be provided in the data structure) from the fixed value and dividing the result by the total number of ranges, and then subtracting the first value.

At step 1210, the process 1200 includes determining the first length using information provided by the data structure. In some examples, the first length is indicated using a value in the data structure. In some examples, the first length is equal to a total length of the set of ranges, in which case the decoding device can determine the first length by subtracting the first length from a maximum value of the range of input values. Also in this example, the decoding device can determine the second length includes dividing the first length by a number of ranges in the set of ranges. In some examples, process 1200 may also include determining, based on the first value, that the set of ranges includes a first set of input values from a beginning of the range of input values, and wherein the first range includes a second set of input values, from the range of input values, that follow the first set of input values.

At step 1212, the process 1200 includes reconstructing the piecewise linear function using the first length, the second length, and scale factors associated with each of the non-overlapping ranges, wherein the scale factors are included in the data structure. Reconstructing the piecewise linear function can include, for example, multiplying each range of the non-overlapping ranges by the scale factor associated with each range. Once reconstructed, the piecewise linear function can provide an output value for each possible input value, where the input values are color values from the portion of the input video frame.

At step 1214, the process 1200 includes decoding the portion of the video frame. Decoding the video frame can include performing steps such as are described below with respect to FIG. 14.

At step 1216 of FIG. 12, the process 1200 includes applying the piecewise linear function to the colors in the portion of the video frame to perform dynamic range adjustment, as discussed above.

In some examples, the process 1200 further includes determining, from a second indicator in the data structure, that the non-overlapping ranges include a second range having a third length, where third length is different from the second length. In these examples, the non-overlapping ranges include two ranges that have different lengths than the set of ranges. In these examples, the process 1200 can further include determining the third length from a third value in the data structure.

The methods and operations discussed herein may be implemented using compressed video, and may be implemented in an example video encoding and decoding system (e.g., system 100). In some examples, a system includes a source device that provides encoded video data to be decoded at a later time by a destination device. The source device can, for example, provide the video data to a destination device via a computer-readable medium. In some examples, the computer-readable medium is transitory. In some examples, the computer-readable medium is non-transitory. The source device and the destination device can be any of a wide range of devices, including desktop computers, notebook (i.e., laptop) computers, tablet computers, smartphones, cellular communication devices, wireless communication devices, set-top boxes, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium can be any type of medium or device capable of moving the encoded video data from the source device to the destination device. In one example, computer-readable medium can be a communication medium to enable the source device to transmit encoded video data directly to the destination device in real-time. The encoded video data may be modulated according to a communication standard, such as a wireless communication protocol, and transmitted to the destination device. The communication medium can include any wireless or wired communication medium, such as a radio frequency (RF) spectrum and/or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the destination device.

In some examples, encoded data may be output from an output interface to a storage device. A storage device is one example of a non-transitory computer-readable medium. Similarly, encoded data may be accessed from the storage device by an input interface. The storage device may include any of a variety of distributed or locally accessed data storage media, such as a magnetic, optical, or solid-state drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by the source device. The destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. The destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example, the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. The techniques may also be performed by a video encoder/decoder, typically referred to as a "CODEC." Moreover, the techniques of this disclosure may also be performed by a video preprocessor. The source device and the destination device are merely examples of such coding devices in which the source device generates coded video data for transmission to the destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source of the source device may include a video capture device, such as a video camera, a video archive containing previously captured video, and/or a video feed interface to receive video from a video content provider. As a further example, the video source may generate computer graphics-based data as source video, or a combination of live video, archived video, and computer generated video. In some cases, if the video source is a video camera, the source device and the destination device may form camera phones or video phones, for example. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by the output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may include any of a variety of display devices such as a cathode ray tube (CRT), a liquid crystal display (LCD), a plasma display, an organic light emitting diode (OLED) display, or another type of display device. Various embodiments of the application have been described.

Figure 13:
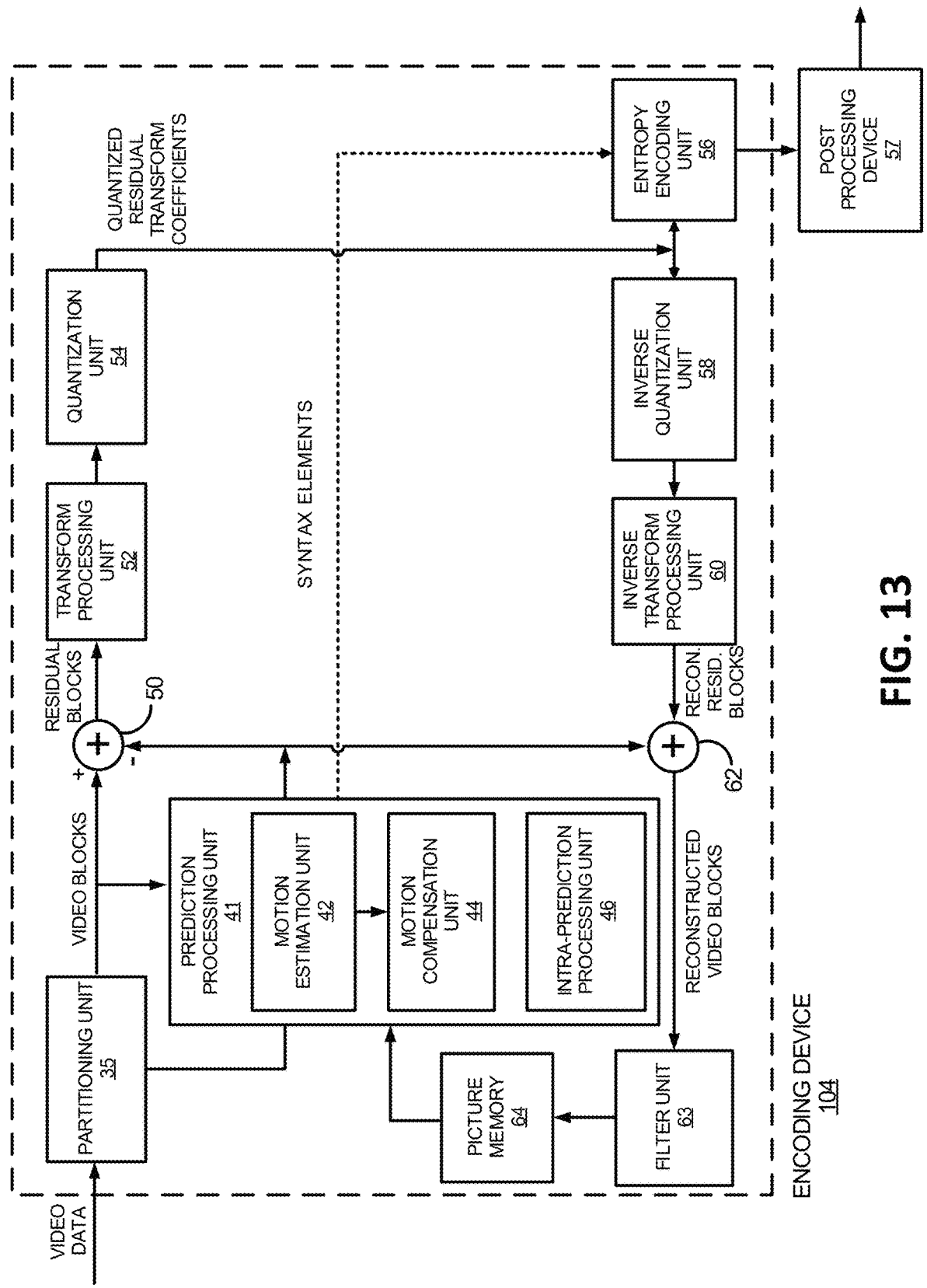
FIG. 13 is a block diagram illustrating an example encoding device.
Figure 14:
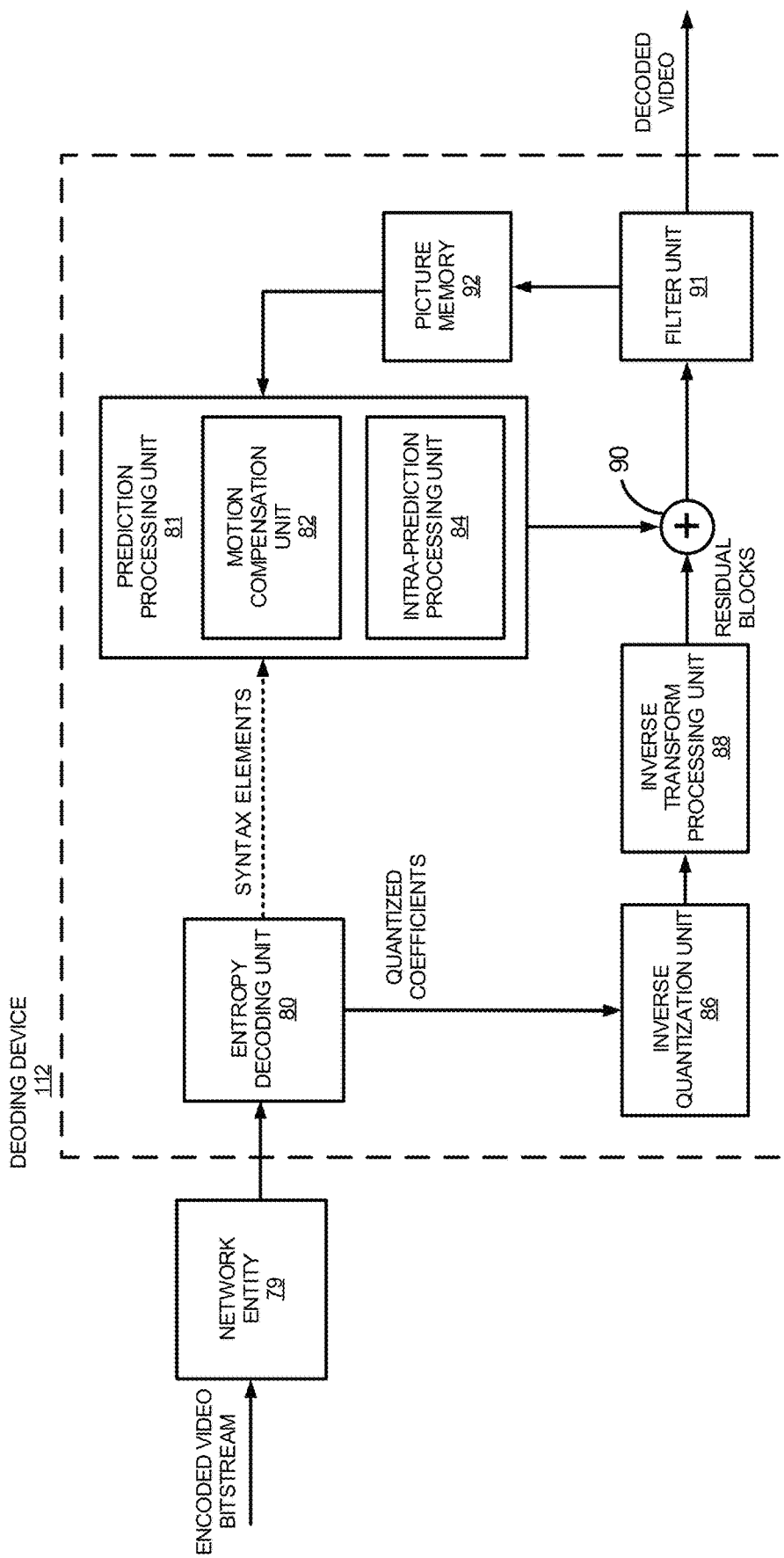
FIG. 14 is a block diagram illustrating an example decoding device.

As noted above, a source device can perform encoding, and thus an include an encoding device to perform this function. As also noted above, a destination device can perform decoding, and thus can include a decoding device. Example details of the encoding device 104 and the decoding device 112 of FIG. 1 are shown in FIG. 13 and FIG. 14, respectively. FIG. 13 is a block diagram illustrating an example encoding device 104 that may implement one or more of the techniques described in this disclosure. The encoding device 104 may, for example, generate the syntax structures described herein (e.g., the syntax structures of a VPS, SPS, PPS, or other syntax elements). The encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. The prediction processing unit 41 includes a motion estimation unit 42, a motion compensation unit 44, and an intra-prediction processing unit 46. For video block reconstruction, the encoding device 104 also includes an inverse quantization unit 58, an inverse transform processing unit 60, and a summer 62. The filter unit 63 is intended to represent one or more loop filters such as a deblocking filter, an adaptive loop filter (ALF), and a sample adaptive offset (SAO) filter. Although the filter unit 63 is shown in FIG. 13 as being an in-loop filter, in other configurations, the filter unit 63 may be implemented as a post-loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by the post processing device 57.

As shown in FIG. 13, the encoding device 104 receives video data, and the partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). The prediction processing unit 41 may select one of multiple possible coding modes, such as an intra-prediction coding modes or an inter-prediction coding modes, for the current video block, based on error results (e.g., coding rate and the level of distortion, or the like). The prediction processing unit 41 may provide the resulting intra- or inter-coded block to a first summer 50 to generate residual block data and to a second summer 62 to reconstruct the encoded block for use as a reference picture.

The intra-prediction processing unit 46 within the prediction processing unit 41 may perform intra-prediction coding of the current video block relative to one or more neighboring blocks in the same frame or slice as the current block to be coded to provide spatial compression. The motion estimation unit 42 and the motion compensation unit 44 within the prediction processing unit 41 perform inter-predictive coding of the current video block relative to one or more predictive blocks in one or more reference pictures to provide temporal compression.

The motion estimation unit 42 may be configured to determine the inter-prediction mode for a video slice according to a predetermined pattern for a video sequence. The predetermined pattern may designate video slices in the sequence as P slices, B slices, or Generalized P and B (GPB) slices (a slice that has identical reference picture lists, List 0 and List 1). The motion estimation unit 42 and the motion compensation unit 44 may be highly integrated, but are illustrated separately for conceptual purposes. Motion estimation, performed by the motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, the motion estimation unit 42 may perform a motion search relative to the full pixel positions and fractional pixel positions and output a motion vector with fractional pixel precision.

The motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in the picture memory 64. The motion estimation unit 42 sends the calculated motion vector to the entropy encoding unit 56 and the motion compensation unit 44.

Motion compensation, performed by the motion compensation unit 44, may involve fetching or generating the predictive block based on the motion vector determined by motion estimation, possibly performing interpolations to sub-pixel precision. Upon receiving the motion vector for the PU of the current video block, the motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. The summer 50 represents the component or components that perform this subtraction operation. The motion compensation unit 44 may also generate syntax elements associated with the video blocks and the video slice for use by the decoding device 112 in decoding the video blocks of the video slice.

The intra-prediction processing unit 46 may intra-predict a current block, as an alternative to the inter-prediction performed by the motion estimation unit 42 and the motion compensation unit 44, as described above. In particular, the intra-prediction processing unit 46 may determine an intra-prediction mode to use to encode a current block. In some examples, the intra-prediction processing unit 46 may encode a current block using various intra-prediction modes, e.g., during separate encoding passes, and the intra-prediction unit processing 46 may select an appropriate intra-prediction mode to use from the tested modes. For example, the intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. The intra-prediction processing unit 46 may calculate ratios from the distortions and rates for the various encoded blocks to determine which intra-prediction mode exhibits the best rate-distortion value for the block.

In any case, after selecting an intra-prediction mode for a block, the intra-prediction processing unit 46 may provide information indicative of the selected intra-prediction mode for the block to the entropy encoding unit 56. The entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include intra-prediction mode index tables and modified intra-prediction mode index tables (also referred to as codeword mapping tables).

After the prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to the transform processing unit 52. The transform processing unit 52 transforms the residual video data into residual transform coefficients using a transform, such as a discrete cosine transform (DCT) or a conceptually similar transform. The transform processing unit 52 may convert the residual video data from a pixel domain to a transform domain, such as a frequency domain.

The transform processing unit 52 may send the resulting transform coefficients to the quantization unit 54. The quantization unit 54 quantizes the transform coefficients to further reduce bit rate. The quantization process may reduce the bit depth associated with some or all of the coefficients. The degree of quantization may be modified by adjusting a quantization parameter. In some examples, the quantization unit 54 may then perform a scan of the matrix including the quantized transform coefficients. Alternatively or additionally, the entropy encoding unit 56 may perform the scan.

Following quantization, the entropy encoding unit 56 entropy encodes the quantized transform coefficients. For example, the entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by the entropy encoding unit 56, the encoded bitstream may be transmitted to the decoding device 112, or archived for later transmission or retrieval by the decoding device 112. The entropy encoding unit 56 may also entropy encode the motion vectors and the other syntax elements for the current video slice being coded.

The inverse quantization unit 58 and the inverse transform processing unit 60 apply inverse quantization and inverse transformation, respectively, to reconstruct the residual block in the pixel domain for later use as a reference block of a reference picture. The motion compensation unit 44 may calculate a reference block by adding the residual block to a predictive block of one of the reference pictures within a reference picture list. The motion compensation unit 44 may also apply one or more interpolation filters to the reconstructed residual block to calculate sub-integer pixel values for use in motion estimation. The summer 62 adds the reconstructed residual block to the motion compensated prediction block produced by the motion compensation unit 44 to produce a reference block for storage in the picture memory 64. The reference block may be used by the motion estimation unit 42 and the motion compensation unit 44 as a reference block to inter-predict a block in a subsequent video frame or picture.

In this manner, the encoding device 104 of FIG. 13 represents an example of a video encoder configured to generate syntax for an encoded video bitstream. The encoding device 104 may, for example, generate a data structure that includes parameters of a piecewise linear function, as described above. The encoding device 104 may perform any of the techniques described herein, including the processes described above with respect to FIGS. 11 and 12. The techniques of this disclosure have generally been described with respect to the encoding device 104, but as mentioned above, some of the techniques of this disclosure may also be implemented by the post processing device 57. Furthermore, devices other than the example encoding device 104, having similar or different components, can be used to perform the techniques described herein.

FIG. 14 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. The prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 13.

During the decoding process, the decoding device 112 receives an encoded video bitstream that represents video blocks of an encoded video slice and associated syntax elements sent by the encoding device 104. In some examples, the decoding device 112 may receive the encoded video bitstream from the encoding device 104. In some examples, the decoding device 112 may receive the encoded video bitstream from a network entity 79, such as a server, a media-aware network element (MANE), a video editor/splicer, or other such device configured to implement one or more of the techniques described above. The network entity 79 may or may not include the encoding device 104. Some of the techniques described in this disclosure may be implemented by the network entity 79 prior to the network entity 79 transmitting the encoded video bitstream to the decoding device 112. In some video decoding systems, the network entity 79 and the decoding device 112 may be parts of separate devices, while in other instances, the functionality described with respect to the network entity 79 may be performed by the same device that includes the decoding device 112.

The entropy decoding unit 80 of the decoding device 112 entropy decodes the bitstream to generate quantized coefficients, motion vectors, and other syntax elements. The entropy decoding unit 80 forwards the motion vectors and other syntax elements to the prediction processing unit 81. The decoding device 112 may receive the syntax elements at the video slice level and/or the video block level. The entropy decoding unit 80 may process and parse both fixed-length syntax elements and variable-length syntax elements in or more parameter sets, such as a VPS, SPS, and PPS.

When the video slice is coded as an intra-coded (I) slice, the intra prediction processing unit 84 of the prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, the motion compensation unit 82 of the prediction processing unit 81 produces predictive blocks for a video block of the current video slice based on the motion vectors and other syntax elements received from the entropy decoding unit 80. The predictive blocks may be produced from one of the reference pictures within a reference picture list. The decoding device 112 may construct the reference frame lists, List 0 and List 1, using default construction techniques based on reference pictures stored in the picture memory 92.

The motion compensation unit 82 determines prediction information for a video block of the current video slice by parsing the motion vectors and other syntax elements, and uses the prediction information to produce the predictive blocks for the current video block being decoded. For example, the motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

The motion compensation unit 82 may also perform interpolation based on interpolation filters. The motion compensation unit 82 may use interpolation filters as used by the encoding device 104 during encoding of the video blocks to calculate interpolated values for sub-integer pixels of reference blocks. In this case, the motion compensation unit 82 may determine the interpolation filters used by the encoding device 104 from the received syntax elements, and may use the interpolation filters to produce predictive blocks.

The inverse quantization unit 86 inverse quantizes, or de-quantizes, the quantized transform coefficients provided in the bitstream and decoded by the entropy decoding unit 80. The inverse quantization process may include use of a quantization parameter calculated by the encoding device 104 for each video block in the video slice to determine a degree of quantization and, likewise, a degree of inverse quantization that should be applied. The inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After the motion compensation unit 82 generates the predictive block for the current video block based on the motion vectors and other syntax elements, the decoding device 112 forms a decoded video block by summing the residual blocks from the inverse transform processing unit 88 with the corresponding predictive blocks generated by the motion compensation unit 82. The summer 90 represents the component or components that perform this summation operation. If desired, loop filters (either in the coding loop or after the coding loop) may also be used to smooth pixel transitions, or to otherwise improve the video quality. A filter unit 91 is intended to represent one or more loop filters such as a deblocking filter, an adaptive loop filter (ALF), and a sample adaptive offset (SAO) filter. Although the filter unit 91 is shown in FIG. 14 as being an in-loop filter, in other configurations, the filter unit 91 may be implemented as a post-loop filter. The decoded video blocks in a given frame or picture are then stored in the picture memory 92, which stores reference pictures used for subsequent motion compensation. The picture memory 92 also stores decoded video for later presentation on a display device, such as the video destination device 122 shown in FIG. 1.

The decoding device 112 of FIG. 14 represents an example of a video decoder configured to parse the syntax of an encoded video bitstream, and approximately reproduce the original video data for subsequent display. The decoding device may, for example, parse a data structure that includes parameters of a piecewise linear function, and apply the piecewise linear function to decoded data to perform Dynamic Range Adjustment, as discussed above. The decoding device 112 may perform any of techniques discussed herein, including the processes described above with respect to FIGS. 11 and 12. Additionally, devices other than the example decoding device 112, which have similar or different components, can be used to perform the techniques described herein.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described examples may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in other embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium that includes program code including instructions that, when executed, performs one or more of the methods described above. The computer-readable data storage medium may form part of a computer program product, which may include packaging materials. The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of encoding video data, comprising:
   obtaining, at an encoding device, video data, the video data including parameters describing a piecewise linear function for dynamic range adjustment of colors in a portion of a video frame, wherein the parameters divide a range of input values to the piecewise linear function into a plurality of non-overlapping ranges, the plurality of non-overlapping ranges including a first range and a set of ranges, wherein the first range has a first length and each range of the set of ranges has a second length that is different from the first length;
   generating a data structure for the parameters;
   setting an indicator in the data structure to indicate that the plurality of non-overlapping ranges includes the set of ranges with each range having the second length;
   based on the plurality of non-overlapping ranges including the set of ranges with each range having the second length, setting a first value in the data structure to indicate the second length for the set of ranges; and
   generating encoded video data from the video data, wherein the data structure is included with the encoded video data.

2. The method of claim 1, wherein the first value indicates the second length as a difference between an end value and a start value of each of the set of ranges.

3. The method of claim 1, wherein the first value indicates the second length by indicating a difference between a fixed value and the second length.

4. The method of claim 1, further comprising:
   setting a second value in the data structure to indicate the first length.

5. The method of claim 1, wherein the first range includes a first set of input values from a beginning of the range of input values, and wherein the set of ranges include a second set of input values, from the range of input values, that follow the first set of input values.

6. The method of claim 1, wherein the parameters further include scale factors associated with each of the plurality of non-overlapping ranges, and further comprising:
   adding the scale factors to the data structure.

7. The method of claim 1, further comprising:
   including the data structure in a Supplementary Enhancement Information (SEI) message, a slice header, or a parameter set.

8. An encoding device, comprising:
   a memory configured to store video data, the video data including parameters describing a piecewise linear function for dynamic range adjustment of colors in a portion of a video frame, wherein the parameters divide a range of input values to the piecewise linear function into a plurality of non-overlapping ranges, the plurality of non-overlapping ranges including a first range and a set of ranges, wherein the first range has a first length and each range of the set of ranges has a second length that is different from the first length; and a processor configured to:
generate a data structure for the parameters;
set an indicator in the data structure to indicate that the plurality of non-overlapping ranges includes the set of ranges with each range having the second length;
based on the plurality of non-overlapping ranges including the set of ranges with each range having the second length, set a first value in the data structure to indicate the second length for the set of ranges; and
generate encoded video data from the video data, wherein the data structure is included with the encoded video data.

9. The encoding device of claim 8, wherein the first value indicates the second length as a difference between an end value and a start value of each of the set of ranges.

10. The encoding device of claim 8, wherein the first value indicates the second length by indicating a difference between a fixed value and the second length.

11. The encoding device of claim 8, wherein the processor is further configured to:
set a second value in the data structure to indicate the first length.

12. The encoding device of claim 8, wherein the first range includes a first set of input values from a beginning of the range of input values, and wherein the set of ranges include a second set of input values, from the range of input values, that follow the first set of input values.

13. The encoding device of claim 8, wherein the parameters further include scale factors associated with each of the plurality of non-overlapping ranges, and wherein the processor is further configured to:
add the scale factors to the data structure.

14. The encoding device of claim 8, wherein the processor is further configured to:
include the data structure in a Supplementary Enhancement Information (SEI) message, a slice header, or a parameter set.

15. The encoding device of claim 8, further comprising: a camera for capturing video data.

16. The encoding device of claim 8, wherein the encoding device comprises a mobile device.

17. A method for decoding video data, comprising:
obtaining encoded video data;
determining, for a portion of a video frame from the encoded video data, a data structure including parameters describing a piecewise linear function for dynamic range adjustment of colors in the portion of the video frame, wherein the parameters divide a range of input values to the piecewise linear function into a plurality of non-overlapping ranges;
determining, from an indicator in the data structure, that the plurality of non-overlapping ranges include a first range and a set of ranges, wherein the first range has a first length and each range of the set of ranges has a second length that is different from the first length;
determining, using a first value in the data structure, the second length, the first value being included in the data structure based on the plurality of non-overlapping ranges including the set of ranges with each range having the second length;
determining the first length using the data structure;
reconstructing the piecewise linear function using the first length, the second length, and scale factors associated with each of the plurality of non-overlapping ranges, wherein the scale factors are included in the data structure;
decoding the portion of the video frame; and
applying the piecewise linear function to the colors in the portion of the video frame to perform dynamic range adjustment.

18. The method of claim 17, wherein the first value provides the second length and wherein a second value in the data structure provides the first length.

19. The method of claim 17, wherein the first value indicates the second length by indicating a difference between a fixed value and the second length.

20. The method of claim 17, wherein a second value in the data structure provides the first length, and further comprising:
determining from an index associated with the second value that the first range includes a first set of input values from a beginning of the range of input values, and wherein the set of ranges include a second set of input values, from the range of input values, that follow the first set of input values.

21. The method of claim 17, wherein the parameters are included in a Supplementary Enhancement Information (SEI) message, a slice header, or a parameter set.

22. A decoding device, comprising:
a memory configured to store encoded video data; and
a processor configured to:
determine, for a portion of a video frame from the encoded video data, a data structure including parameters describing a piecewise linear function for dynamic range adjustment of colors in the portion of the video frame, wherein the parameters divide a range of input values to the piecewise linear function into a plurality of non-overlapping ranges;
determine, from an indicator in the data structure, that the plurality of non-overlapping ranges include a first range and a set of ranges, wherein the first range has a first length and each range of the set of ranges has a second length that is different from the second first length;
determine, using a first value in the data structure, the second length, the first value being included in the data structure based on the plurality of non-overlapping ranges including the set of ranges with each range having the second length;
determine the first length using information provided by the data structure;
reconstruct the piecewise linear function using the first length, the second length, and scale factors associated with each of the plurality of non-overlapping ranges, wherein the scale factors are included in the data structure;
decode the portion of the video frame; and
apply the piecewise linear function to the colors in the portion of the video frame to perform dynamic range adjustment.

23. The decoding device of claim 22, wherein the first value provides the second length and wherein a second value in the data structure provides the first length.

24. The decoding device of claim 22, wherein the first value indicates the second length by indicating a difference between a fixed value and the second length.

25. The decoding device of claim 22, wherein a second value in the data structure provides the first length, and wherein the processor is further configured to:

determine from an index associated with the second value that the first range includes a first set of input values from a beginning of the range of input values, and wherein the set of ranges include a second set of input values, from the range of input values, that follow the first set of input values.

26. The decoding device of claim 22, wherein the parameters are included in a Supplementary Enhancement Information (SEI) message, a slice header, or a parameter set.

27. The decoding device of claim 22, further comprising: a camera for capturing video data.

28. The decoding device of claim 22, further comprising: a display for displaying decoded video data.

29. The decoding device of claim 22, wherein the decoding device comprises a mobile device.

* * * * *